INVENTOR
WILLIAM J. GREENE
BY
ATTORNEY

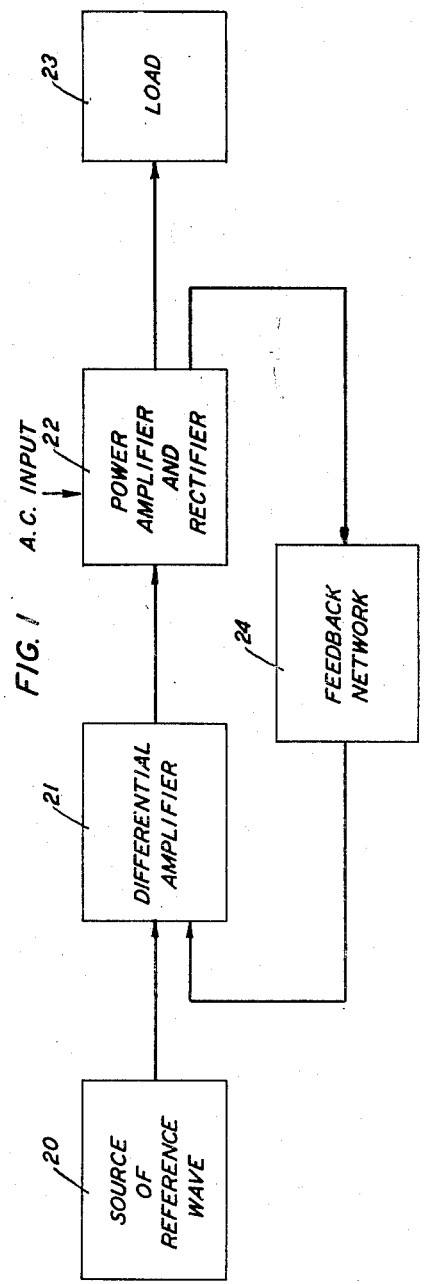
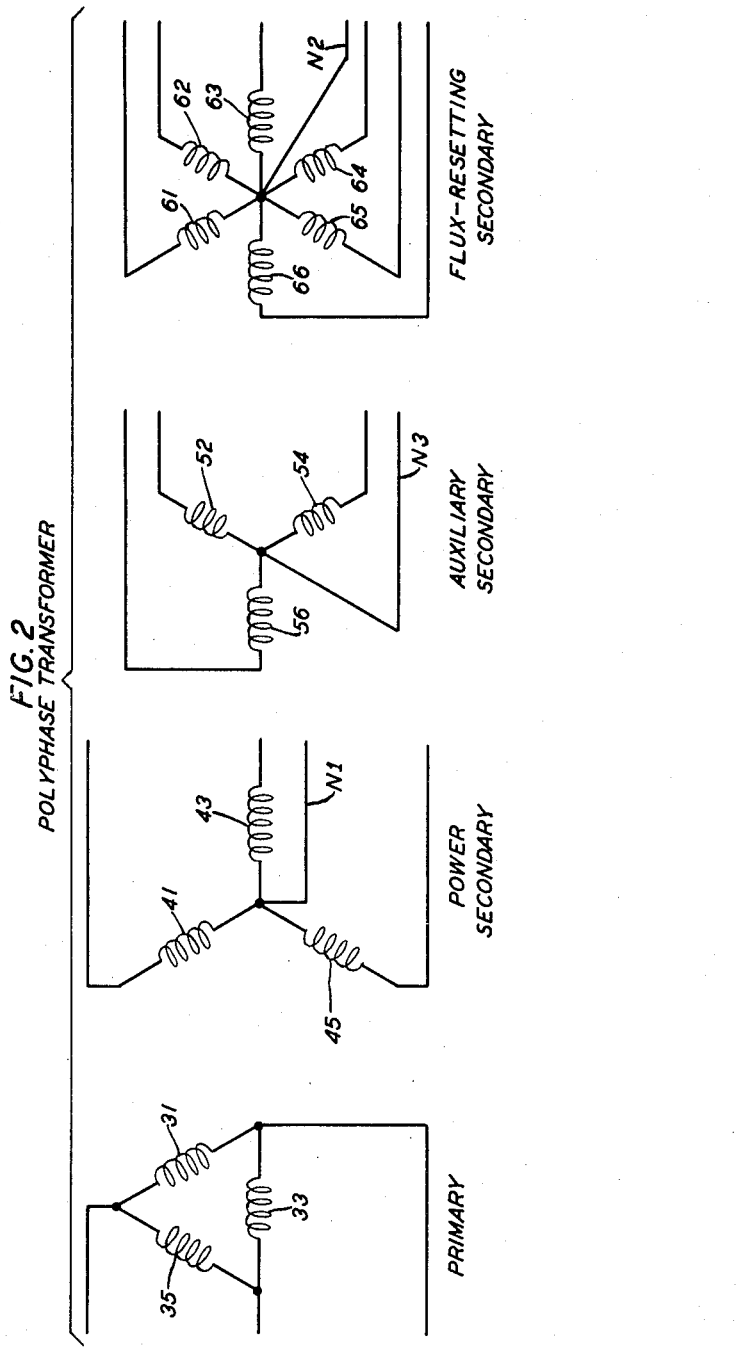

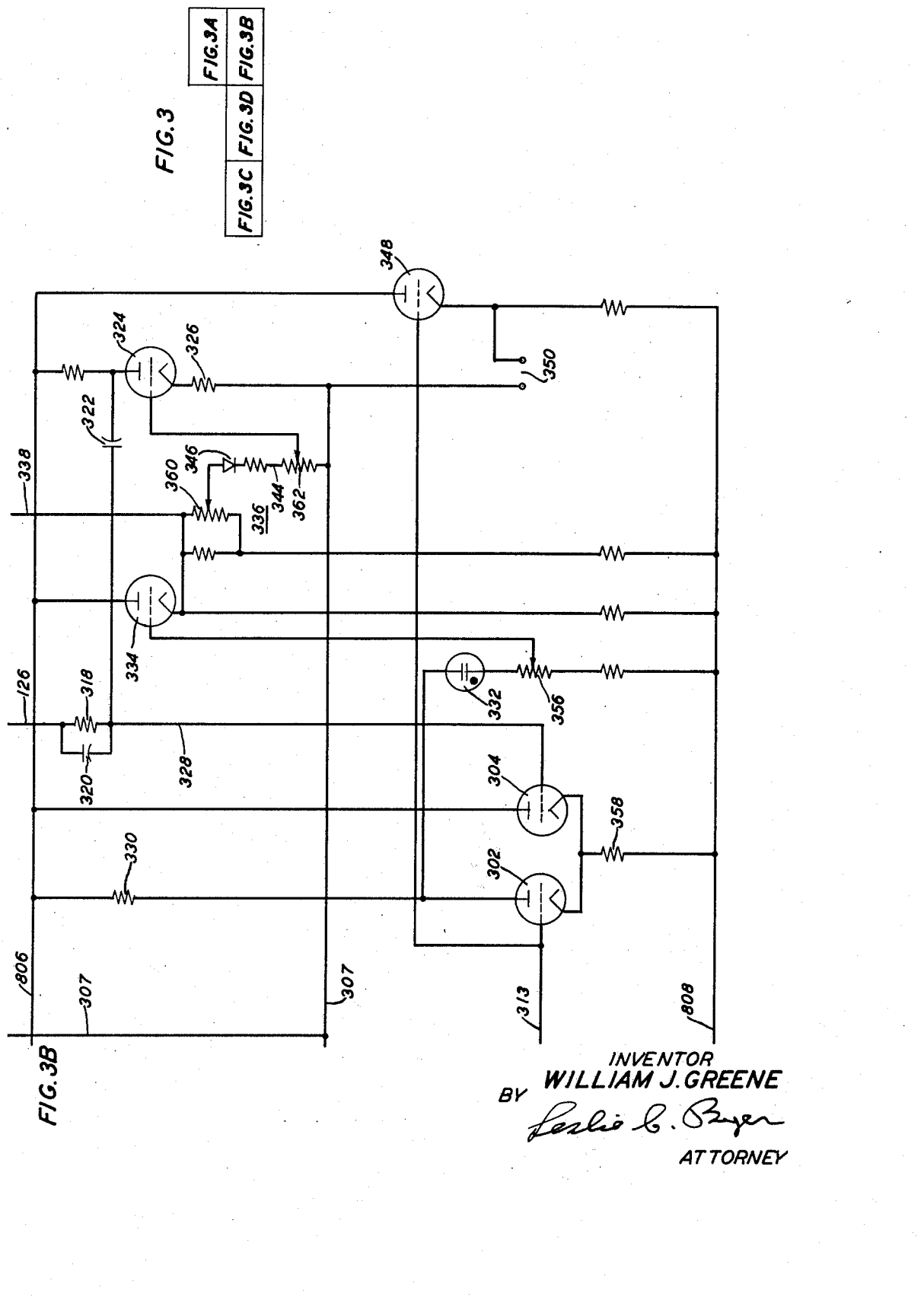

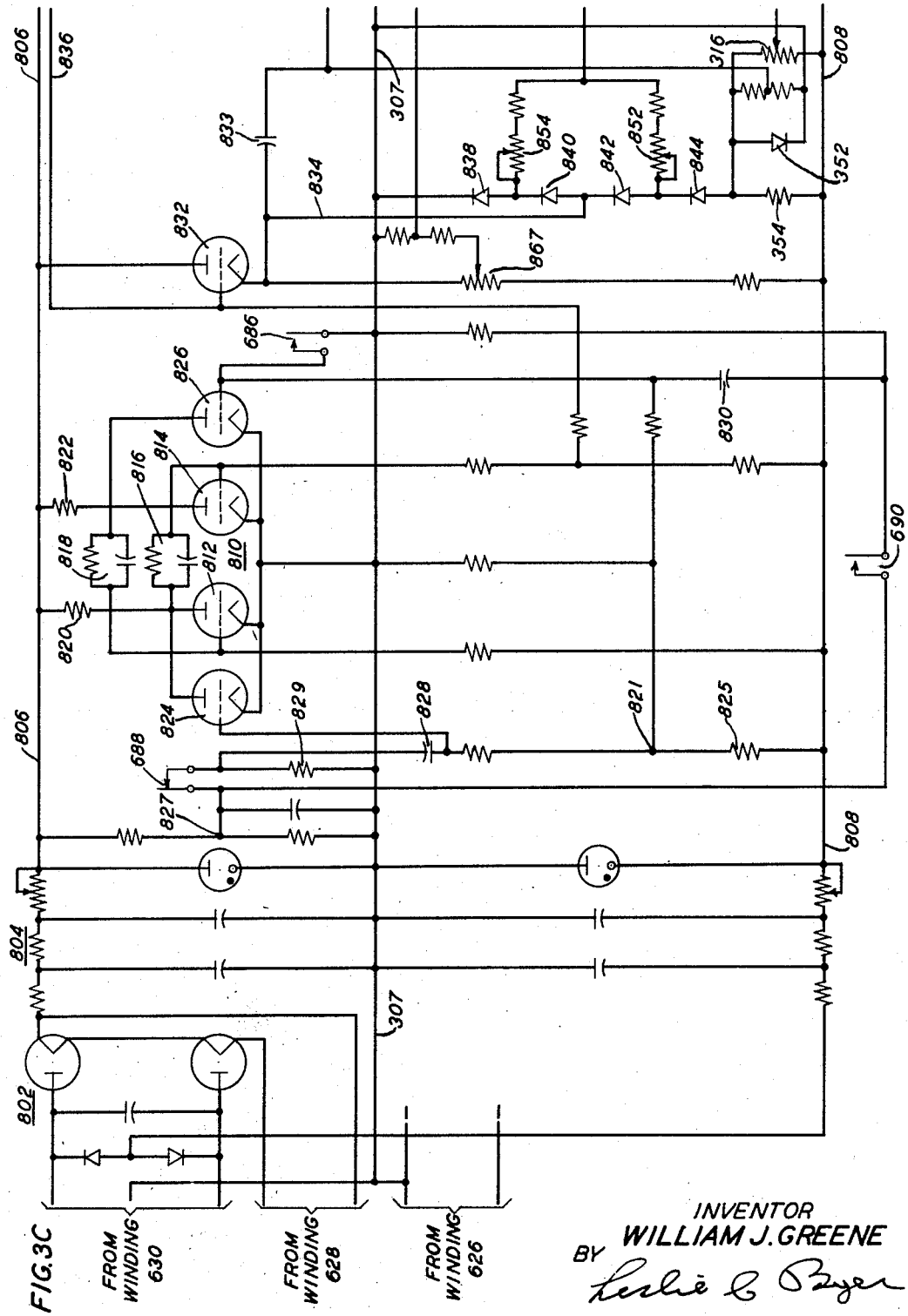

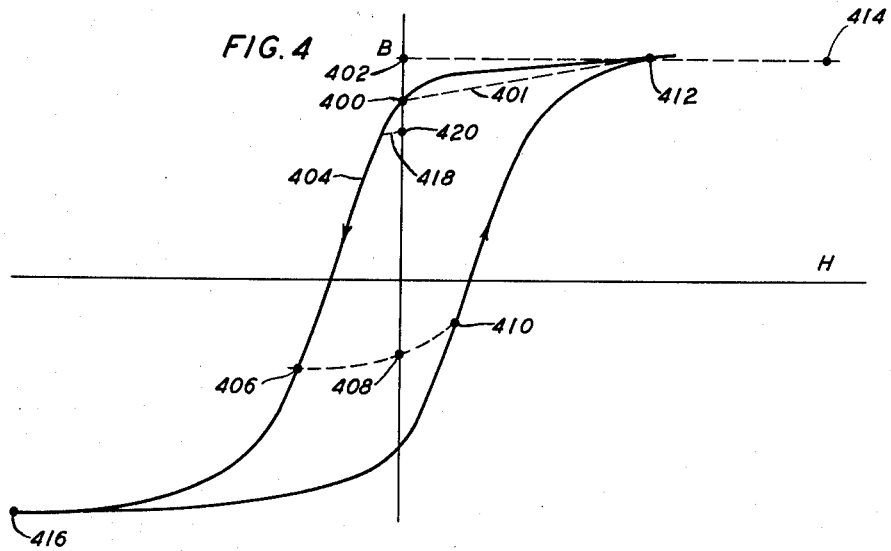
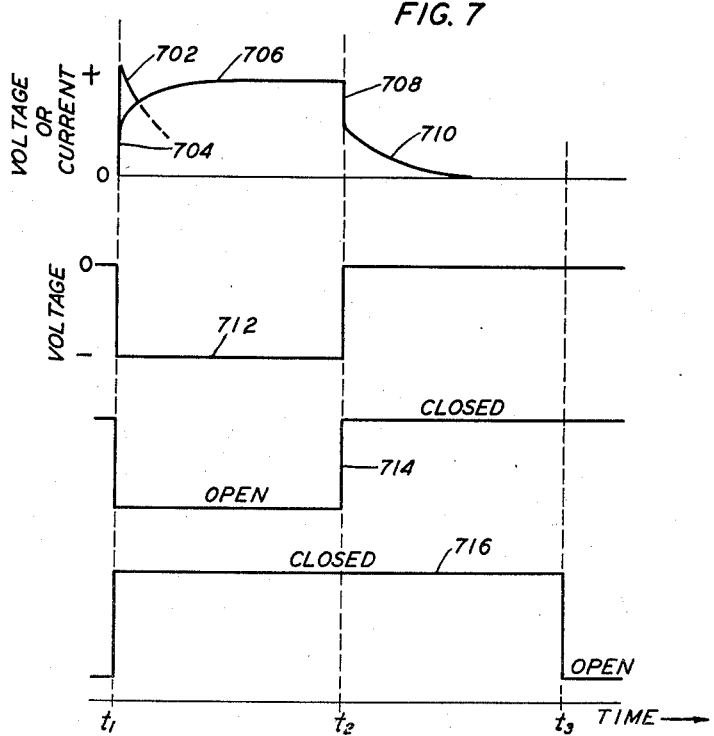

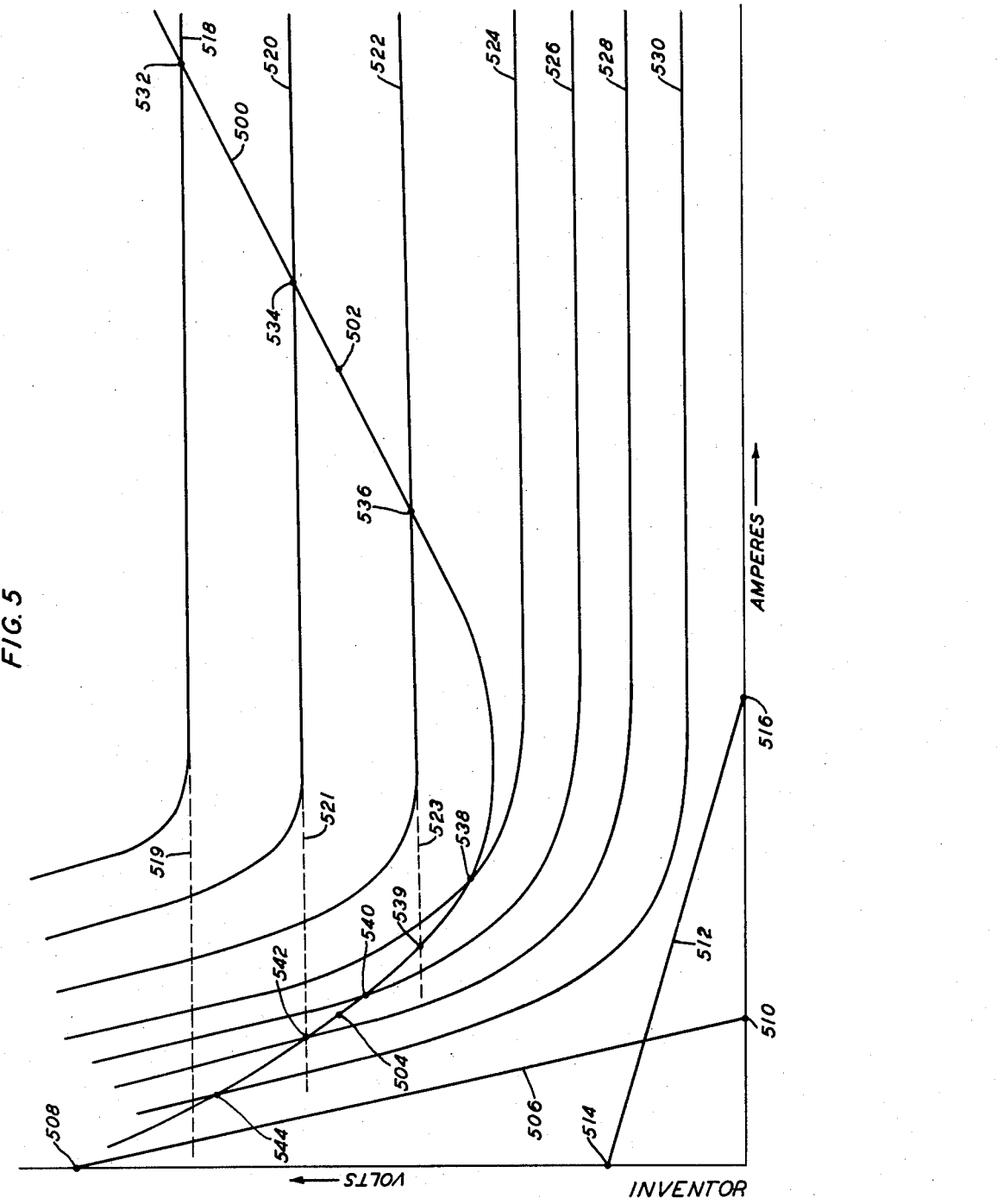

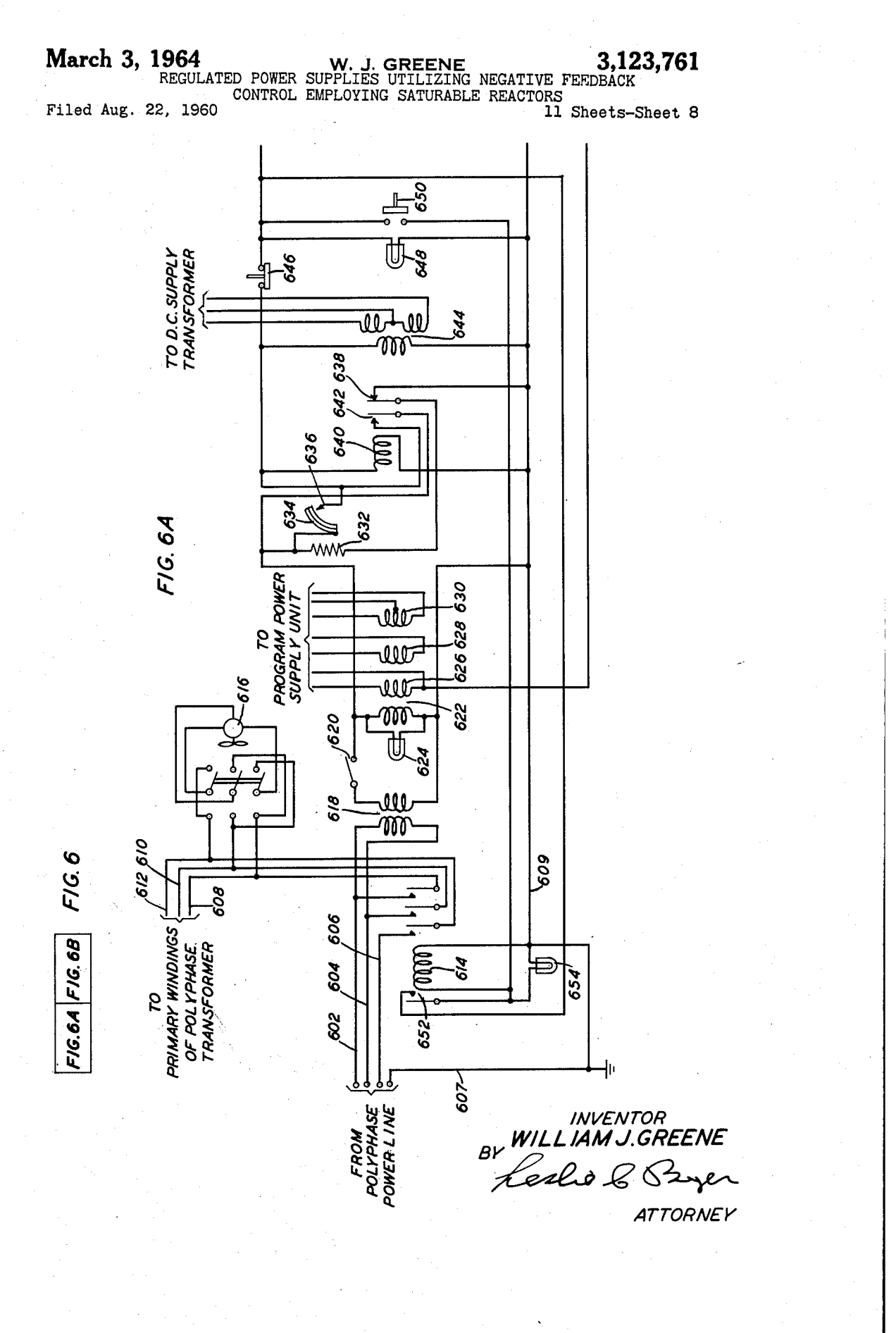

March 3, 1964 W. J. GREENE 3,123,761
REGULATED POWER SUPPLIES UTILIZING NEGATIVE FEEDBACK
CONTROL EMPLOYING SATURABLE REACTORS
Filed Aug. 22, 1960 11 Sheets-Sheet 8

INVENTOR
WILLIAM J. GREENE
BY
ATTORNEY

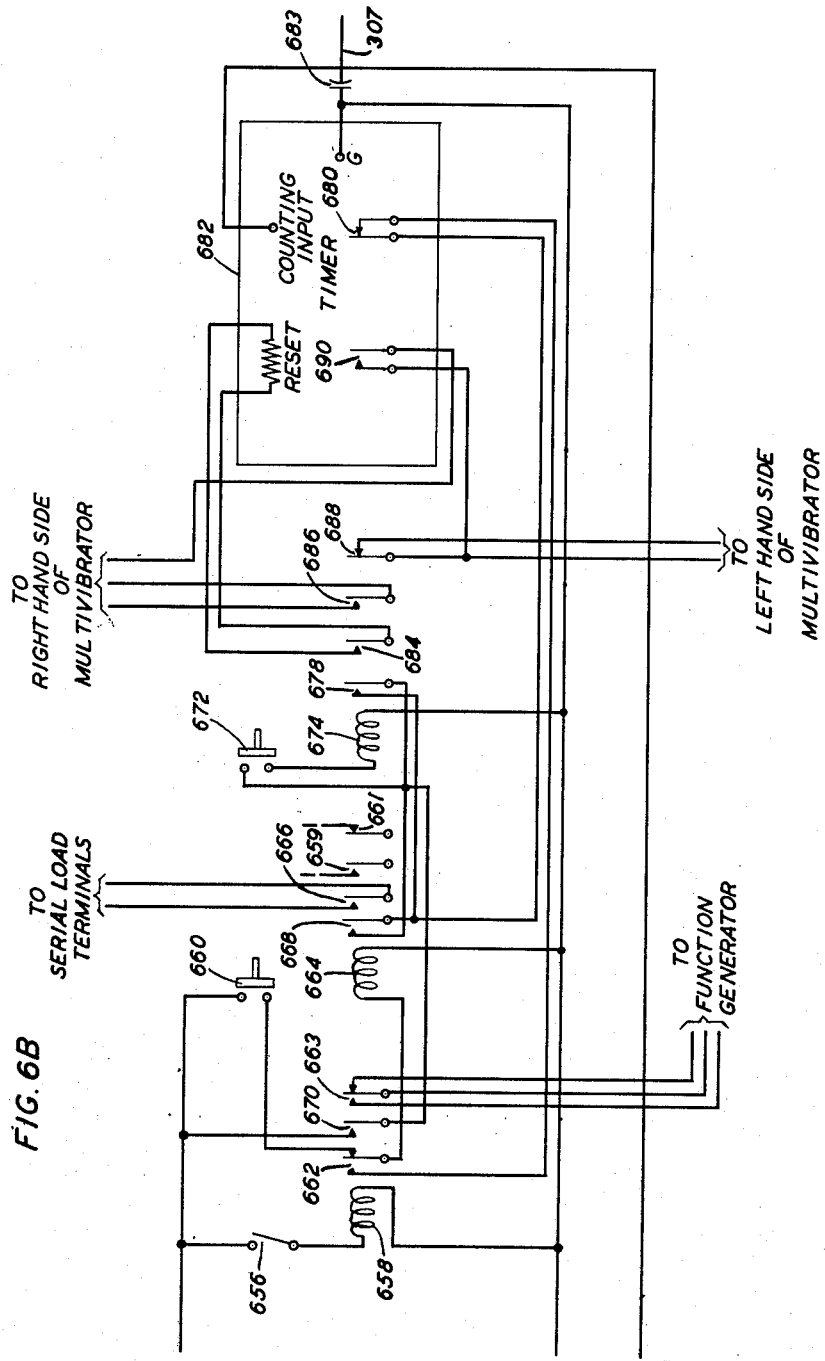

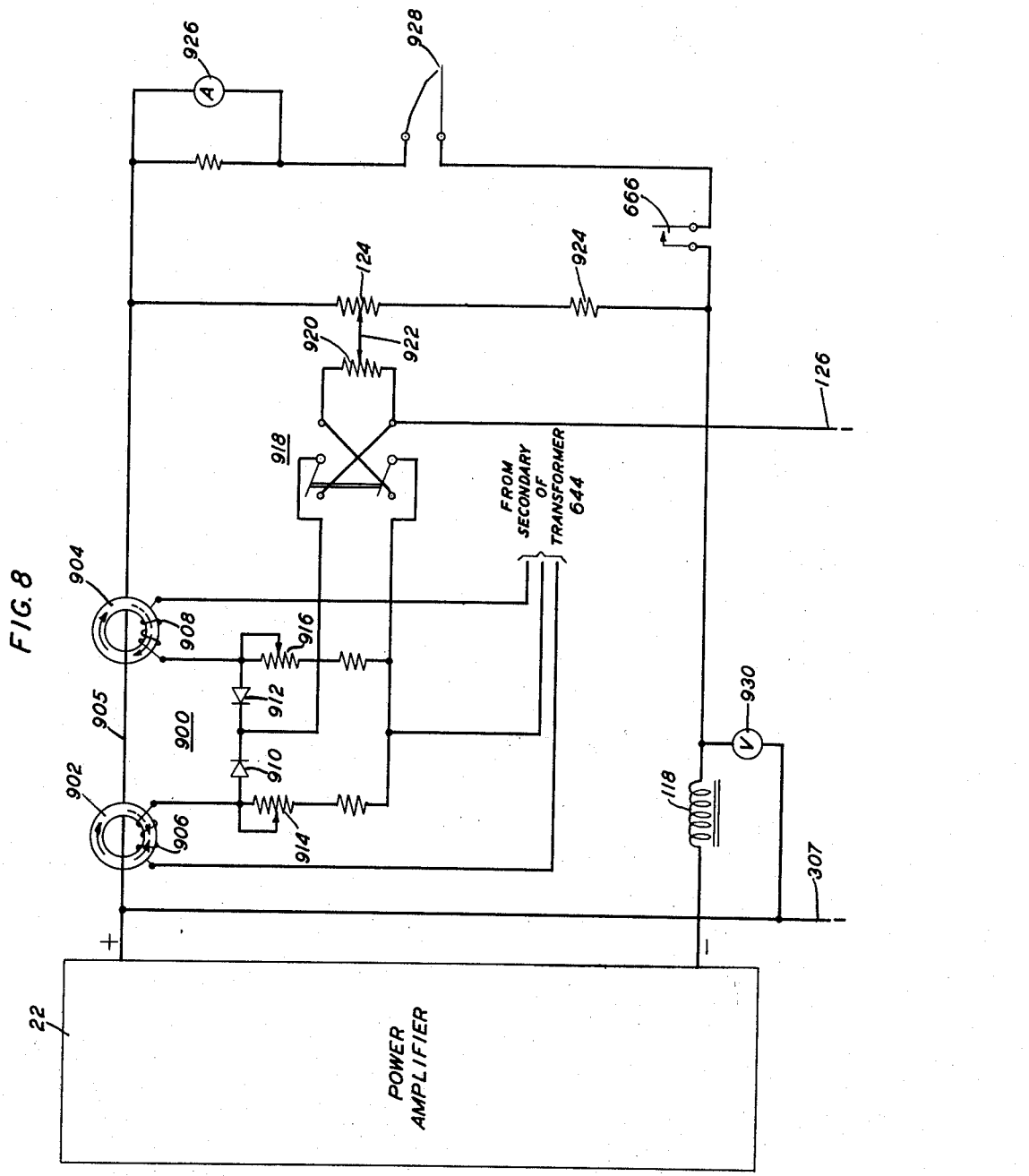

INVENTOR
WILLIAM J. GREENE
BY
*Leslie C. Boyer*
ATTORNEY

United States Patent Office 3,123,761
Patented Mar. 3, 1964

3,123,761
REGULATED POWER SUPPLIES UTILIZING NEGATIVE FEEDBACK CONTROL EMPLOYING SATURABLE REACTORS
William J. Greene, Scotch Plains, N.J., assignor to Air Reduction Company, Incorporated, New York, N.Y., a corporation of New York
Filed Aug. 22, 1960, Ser. No. 51,107
19 Claims. (Cl. 321—25)

This invention relates to regulated power supplies and more particularly to means and methods employing negative feedback control in conjunction with saturable reactors.

An object of the invention is to improve the flexibility of a power supply in order to make it capable of automatically carrying out a variety of predetermined programs of load current or voltage as a function of time or to make it have any one of a plurality of voltage-current characteristics, with ready means of selecting the desired program or characteristic.

The invention is described and shown herein in connection with an illustrative embodiment in welding equipment but it is to be understood that the invention is not limited to welding or the like. A reference wave is provided which may be a constant voltage or current or which may vary as a function of time to control a program of operation. The reference wave is used to control a combination of a magnetic amplifier and a polyphase rectifier in such manner as to impress upon a load circuit an average output which is an amplified replica of the reference wave. A feedback connection is made from the output of the magnetic amplifier through a feedback network to a first input of a differential amplifier, the reference wave being applied to a second input thereof. The reference wave and the output wave of the magnetic amplifier are compared in the differential amplifier and any difference developing between the two waves is used to control the output of the magnetic amplifier in the direction of reducing the difference between the two waves so compared.

Such a power supply constitutes a universal or general purpose power source which can be varied to suit the needs of the operations to be performed. It has a particular advantage that whereas in the past a plurality of machines were required some of which were provided with special power supplies for one purpose and some for another, all of the machines may be provided with universal power supplies of the type described herein so that any machine may be called upon at any time to perform any type of operation within the scope of the universal power supply, thereby increasing the number of machines available for any particular operation without the need of a surplus of possibly idle machines. Each machine may have its power supply adjusted individually according to the requirements of the work.

Other objects include improving the stability and reliability of a power regulating system particularly under conditions of negative impedance in the load circuit and of failure of load current, and under starting conditions for certain types of loads, for example electric arcs.

A particular object involves protection of a saturable reactor from damage due to misfiring. Such a reactor is commonly operated in alternately recurring setting and resetting cycles. During the setting cycle, the reactor first passes very little current, then normally fires, after becoming saturated and passing a relatively large current. During the resetting cycle, the flux in the reactor is reset to a predetermined unsaturated value. Firing (saturating) during the resetting cycle is to be avoided.

Another object is to improve the cooperative relationship between a magnetic amplifier and a polyphase rectifier.

In polyphase rectifier circuits, the outputs of the rectifiers in the individual phases are commonly joined together and the combined output of the several rectifiers is supplied to the load. One set of rectifiers conducts current from the polyphase transformer toward the load while another set of rectifiers conducts current from the load back toward the tranfsormer. At any instant, only one phase will be found to be supplying current to the load and one other phase will be found to be drawing current back to the transformer from the load. This is because when one rectifier in either set becomes conductive it constitutes a very low impedance and so the cathode of this rectifier assumes substantially the same potential as the anode of the same rectifier. Since the cathodes of all the rectifiers in the set are connected together, the anode potential of the rectifier that is conducting is impressed upon all the cathodes. As the rectifier that becomes conductive is the one with the most positive anode potential, the cathodes of all the other rectifiers in the set are made more positive than their respective anodes, so that all these rectifiers are held in the non-conductive state until some other phase becomes the most positive phase and thus brings the rectifier in that phase into conduction and cuts off the first rectifier. In a three phase system it will be noted that each phase occupies the position of most positive phase during a period of approximately 120 electrical degrees, each phase occupying this position in rotation. Consequently, in each phase there is a period of approximately 30 degrees at the beginning of the positive half cycle of generated electromotive force and approximately 30 degrees at the end of the half cycle when no current is supplied to the load by that phase.

A feature of the invention is the provision of auxiliary polyphase rectifiers connected in a stand-by setting circuit for the saturable reactors in a magnetic amplifier, which circuit includes a path in shunt to the load circuit so that setting is assured even though the load circuit may become open and load current may fail.

In order to provide setting current during the full positive half cycle in each phase, a separate impedance element or resistor is employed in the auxiliary setting circuit for each phase in a polyphase magnetic amplifier, whereby a rectifier in one phase by becoming conductive does not cut off the rectifiers in the other phases.

Another feature is the provision of one or more auxiliary power supplies to operate in parallel with a magnetic amplifier for imparting a drooping volt-ampere characteristic in a low current range so as to change the composite characteristic of the magnetic amplifier plus the auxiliary supplies from that of a constant potential source to that of a source which is substantially a constant potential source in a high current range but supplies increasing voltage with decreasing current in a low current range. This feature serves to produce a stable output at all current values and to avoid instability in the presence of negative impedance such as may be exhibited by an arc.

A further feature is the provision of a frequency selective impedance network in the feedback path of a magnetic amplifier to avoid instability or oscillations at frequencies in the neighborhood of a critical frequency. Such a condition may occur, for example, at the frequency of the alternating power source due to the fact that a one-half cycle delay is inhrent in the control of the magnetic amplifier by means of the feedback so that negative feedback tends to be displaced by positive feedback at these frequencies. The selective network is employed to make the feedback circuit insensitive to fluctuations at or near the critical frequency.

Still another feature is the provision of means to disable the feedback stabilizing network automatically when the magnetic amplifier control voltage is less than a predetermined minimum corresponding to a given low current level. In the case of arc welding, for example, the stabilization provided by the feedback circuit is not needed at the very low current levels because of the auxiliary supply. If stabilization is employed at these lower control voltages it tends to needlessly retard the response of the magnetic amplifier to changes in the control voltages. Accordingly, the means provided for selectively controlling the feedback promotes substantially uniform response to changes in the control voltage in the lower control voltage range.

Other features, objects and advantages will appear from the following more detailed description of an illustrative embodiment of the invention, which will now be given in conjunction with the accompanying drawings.

In the drawings:

FIG. 1 is a block diagram showing the general organization of a system embodying the invention;

FIG. 2 is a schematic diagram of an illustrative form of a polyphase transformer suitable for use with a system embodying the invention;

FIG. 3 shows how FIGS. 3A, 3B, 3C and 3D are to be arranged to form a detailed schematic diagram of a magnetic amplifier, a feedback system and a function generator embodying the features of the invention, together with an accompanying rectifier and filter;

FIGS. 3A, 3B, 3C and 3D are the component parts of the composite drawing represented in FIG. 3;

FIG. 3A is mainly a schematic diagram of the magnetic amplifier;

Figure 3A:
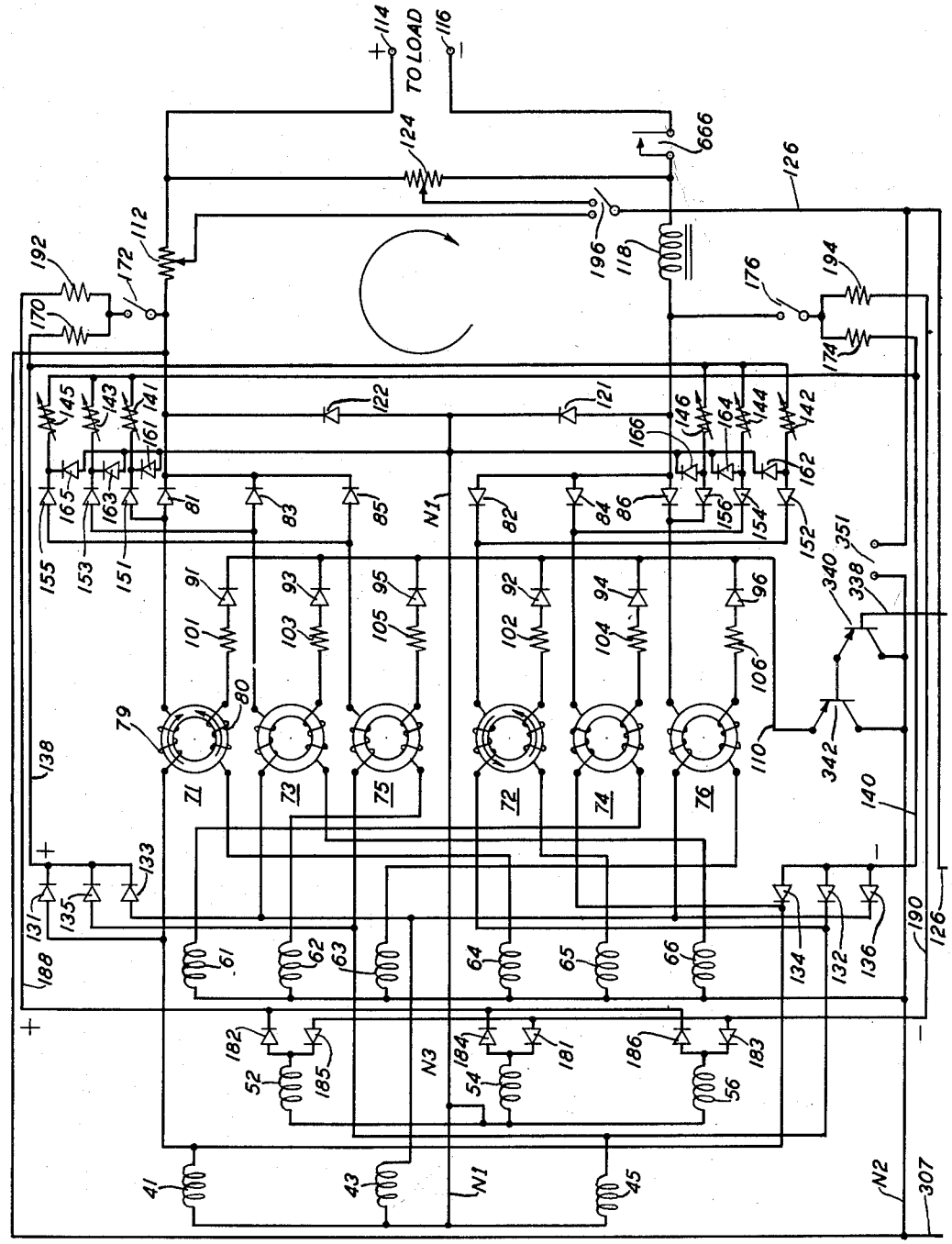
Figure 3D:
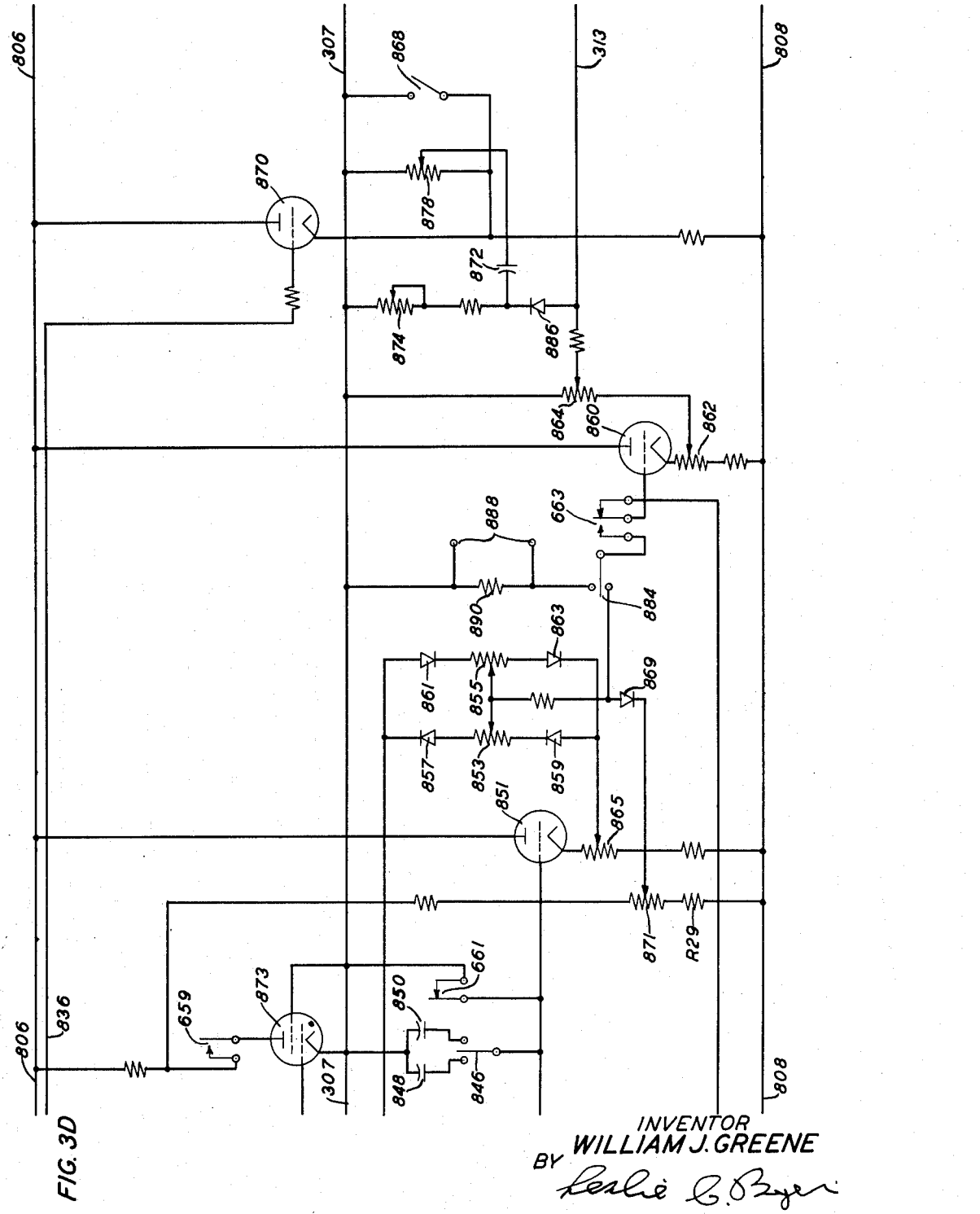
Figure 9:
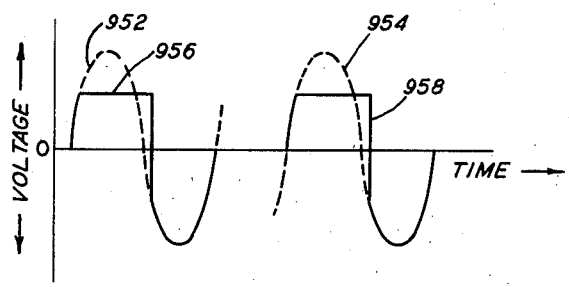
Figure 11:
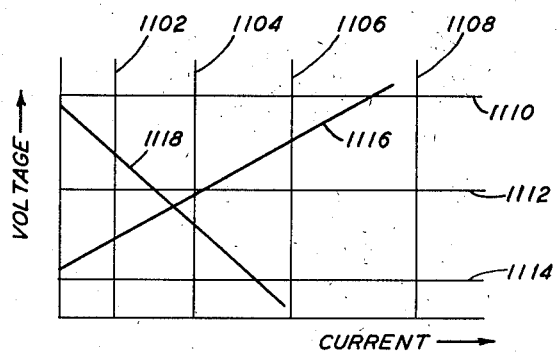
Figure 10:
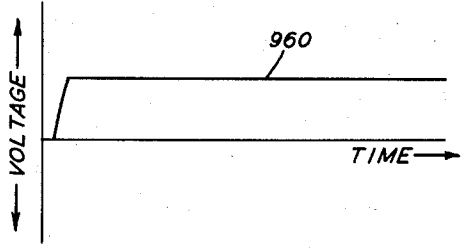

FIG. 3B relates mainly to the feedback circuit;

FIG. 3C and FIG. 3D relate to the rectifier, filter and function generator;

FIG. 4 is a graph of an illustrative hysteresis loop of a saturable reactor, which diagram is useful in explaining the operation of the invention;

FIG. 5 is a voltage-current graph of a load characteristic involving negative impedance, together with power supply characteristics of types suitable for supplying power to a load exhibiting negative impedance;

FIG. 6 shows how FIGS. 6A and 6B are to be arranged to form a schematic diagram of a starting and controlling circuit for a system embodying the invention;

FIGS. 6A and 6B are the component parts of the composite drawing represented in FIG. 6;

FIG. 7 is a set of time charts useful in explaining the operation of certain features of the invention;

FIG. 8 is a schematic diagram of a portion of a system of the type shown in FIG. 3A with modifications to show apparatus for combined current feedback and voltage feedback;

FIGS. 9 and 10 are time charts useful in explaining the operation of a direct current sensing arrangement shown in FIG. 8; and FIG. 11 is a voltage-current graph useful in explaining the operation of the feedback circuits shown in FIG. 8.

FIG. 1 shows in block diagram form the general class of system to which the illustrative embodiment of the invention herein belongs. A source 20 of a reference wave is shown connected to a first input of a differential amplifier 21. The output of the differential amplifier is connected to the input of a power amplifier 22 which supplies to a load 23 an average output which is an amplified replica of the reference wave. A feedback network 24 is connected between the output of the power amplifier and a second input of the differential amplifier for controlling the average output of the power amplifier to conform to the wave shape of the reference wave.

FIG. 2 shows a polyphase power transformer which may be used to supply power to the power amplifier 22. The transformer may have a three-phase primary which may comprise phase windings 31, 33, 35, in delta connection to a three-phase power line. The transformer may have three secondary winding arrays. A power secondary is shown having phase windings 41, 43, 45 in star Y connection. An auxiliary secondary is shown having phase windings 52, 54, 56 in star connection. The phases of the windings 52, 54, 56, may be intermediate to the phases of the windings 41, 43, 45. The latter two sets of windings may be regarded together as forming a six-phase system. A six-phase flux-resetting secondary array is shown as comprising phase windings 61, 62, 63, 64, 65, 66, for use in controlling the average output of the magnetic amplifier. Neutral line connections N1, N2, N3, may be provided for the power secondary, the flux-resetting secondary and the auxiliary secondary, respectively.

FIG. 3A shows, in schematic form, the power circuits and a portion of the control circuits of a power amplifier, shown as a magnetic amplifier, embodying various features of the invention. In this figure, the various secondary windings shown in FIG. 2 are arranged in horizontal rows, the successive rows being arranged in order from top to bottom indicative of the order in which the six phases are excited by the rotating flux in the transformer. The magnetic amplifier proper comprises a saturable reactor in each phase. The reactors are designated 71 through 76, inclusive, each reactor having a saturable magnetic core, a load winding and a flux-resetting or control winding. The reactor 71 has a load winding 79 and a control winding 80. The winding 79 is connected between the power secondary winding 41 and a unidirectional conductor, rectifier or diode 81, the conductive direction of the element 81 as shown being the direction away from the winding 41 and the manner of winding upon the core of the reactor 71 is assumed to be such as to tend to establish a magnetic flux in the core in the clockwise direction as indicated by the upper arrow within the core. The winding 80 is connected between the control secondary winding 64 and a unidirectional conductor 91 by way of a current limiting resistor 101, the conductive direction of the element 91 being the direction away from the winding 64 and the manner of winding upon the core of the reactor 71 is assumed to be such as to tend to establish a magnetic flux in the core in the counterclockwise direction as indicated by the lower arrow within the core. It will be noted that due to the direction of the diode 81 load current can flow in the winding 79 if current is leaving the winding 41 in the direction away from the neutral line N1. Due to the direction of the diode 91 control current can flow in the winding 80 if current is leaving the winding 64 in the direction away from neutral line N2.

The reactor 73 has its load winding connected to the power secondary 43 and its control winding connected to the control secondary 66. Similarly, the reactor 75 has its load winding connected to power winding 45 and its control winding connected to control secondary 62; the reactor 72 has its load winding connected to power winding 45 and its control winding to control secondary 65; the reactor 74 has its load winding connected to power winding 41 and its control winding connected to control secondary 61; and the reactor 76 has its load winding connected to power winding 43 and its control winding connected to control secondary 63. In the case of each reactor, it will be noted that due to the relative phase connections of the various windings, control current may not flow during the part of the power cycle when load current is flowing, and conversely, load current does not flow during the part of the power cycle when control current is flowing. In general, when load current flows through any reactor in the group, the flux in the associated core is changed from some preset value and brought to saturation, thereby permitting substantial load current to flow during the remainder of the half cycle after the saturation value has been reached, so that the output current may be regulated by varying the preset value of the flux. Then, when the control current flows the flux is returned or reset to its preset value ready for the next half cycle. Diodes 82 through 86, inclusive, are provided in the remaining load circuits and diodes 92 through 96 inclusive, and limiting resistors 102 through 106, inclusive, in the remaining control winding circuits. The cathode terminals of the diodes 91 through 96, inclusive, are connected in common to a line 110 which runs to the differential amplifier through controlling transistors and provides adjustment of the amplitude of the control coil voltage as needed to control the output of the magnetic amplifier, in known manner.

The load circuit diodes 81, 83, 85, have their cathodes connected together to form a positive source of rectified current to supply the load, through a current measuring potentiometer 112. The terminals to which a load, for example, a welding or cutting arc or the like may be connected are shown as a positive terminal 114 and a negative terminal 116. To smooth out ripples in the rectified current to the load, an inductor 118 is provided in series with the load. Unidirectional conductors 121 and 122 are provided to carry the load current so as to prevent the full load current of all phases combined from flowing through a load winding of any reactor 71, 72, etc., which may momentarily be in an unsaturated state and which might thereby become prematurely saturated. Load currents from reactors in the saturated state, however, may pass into the load freely whenever necessary to maintain the load current at its average value as determined by the control system.

To provide a voltage feedback for control purposes, a potentiometer 124 may be connected across the load. A line 126 may be extended from the movable contactor of either the potentiometer 112 or the potentiometer 124 through a switch 196 to the input terminal of the feedback network. A combination of voltage and current feedback also may be provided by means to be described below.

FIG. 3B shows the differential amplifier and associated circuits comprising a part of the feedback system for the control of the magnetic amplifier of FIG. 3A. The differential amplifier may comprise two thermionic tubes 302 and 304 which may constitute a dual triode enclosed in a single envelope. A power supply for the differential amplifier and associated circuits, shown as a balanced, filtered rectifier in FIG. 3C, has a positive portion connected between a positive line 806 and a signal ground line 307 and a negative portion connected between the ground line 307 and a negative line 808. The lines 806, 307, 808 are shown extended into FIG. 3B. By means of switches provided in FIG. 3D, either a function generator or a source of constant voltage may be connected to the grid of the tube 302 over a line 313. Either the standard voltage source or the function generator thus may serve as the source 20 of a reference wave shown in FIG. 1.

The feedback line 126 is connected through a feedback network comprising parallel combination of a resistor 318 and a capacitor 320, and thence through a series capacitor 322, the anode-cathode path of a tube 324 which may be a triode, and a cathode resistor 326 to the ground line 307. A line 328 serves to impress upon the grid of the tube 304 a portion of the voltage in the feedback network. The output of the differential amplifier is developed in an anode load resistor 330 and is impressed by way of a voltage regulating gas-filled diode 332 onto the grid of a cathode follower 334. The output of the cathode follower 334 is developed in a cathode resistance network 336. A line 338 transfers a voltage developed in the network 336 to the base electrode of a transistor 340 (FIG. 3A). The emitter electrode of the transistor 340 is connected to the base electrode of transistor 342 cascade with transistor 340. The emitter electrode of the transistor 342 is connected to the line 110 which comes from the control windings of the magnetic amplifier. The collector electrodes of the transistors 340 and 342 are connected to the ground line 307 and neutral line N2. Thus, the control windings of the magnetic amplifier are under the control of the output from the differential amplifier and the input of the differential amplifier serves to compare a reference wave with a wave fed back from the load circuit of the magnetic amplifier. A line 344 is provided connecting the network 336 to the grid of the tube 324 through a unidirectional conductor shown as a diode 346. When current is stopped by the diode 346, the tube 324 is rendered inoperative in order to nullify the feedback action. This occurs at control voltage values for which feedback is not beneficial. A cathode follower 348 may be provided having its grid connected to the grid of tube 302 and having output terminals at 350 to which an oscilloscope (not shown) may be connected, whereby the waveform of the reference wave may be observed. The tubes 324 and 348 may comprise a dual triode. Another oscilloscope connection is shown at 351 (FIG. 3A) for observation of the waveform of the output current of the magnetic amplifier.

The operation of the apparatus shown in FIG. 3B in relationship to the magnetic amplifier and load circuit shown in FIG. 3A will now be described. First, let it be supposed that the grid of the tube 302 is connected to a constant voltage source. The output of the differential amplifier, appearing across the load resistor 330, is approximately proportional to the difference between the input voltages of the tubes 302 and 304. This output is impressed upon the grid of the cathode follower 334 by way of the constant-voltage device 332 to vary the anode current of the cathode follower and thus control the cathode voltage of the tube 334 relative to the voltage of the negative line 808. The voltage across the cathode network 336 thus depends upon the grid potential of the tube 334 and consequently upon the difference between the reference voltage and the feedback voltage applied to the differential amplifier. The voltage across the network 336 is in opposition to the voltage impressed upon the line 110 which is fed by the rectified currents passing through the control windings of the magnetic amplifier. A very small portion of the rectified current from the line 110 passes through the emitter of the transistor 342, through the base electrode of that transistor into the emitter electrode of the transistor 340 and through the base electrode of that transistor, and thence via the line 338, the network 336, and power connections to signal ground.

When the voltage impressed between the emitter and collector electrodes of the transistor 340 or 342 becomes more positive than a positive voltage impressed between the base and collector electrodes, the impedance of the emitter-collector circuit of the transistor becomes very small. The emitter current then is limited only by the impedances in the emitter-collector circuit. The resetting voltage impressed upon any control winding (such as winding 80) by the associated resetting power secondary winding divides between the control winding and the transistor 342 in such manner as to maintain the emitter-collector voltage of the transistor slightly more positive than the base-collector voltage. Since the generated resetting voltage is of substantially constant amplitude, the voltage across any control winding is substantially determined by the base-collector voltage of the transistor 342. This latter voltage is the same as the emitter-collector voltage of the transistor 340. The emitter-collector voltage of the transistor 340 is determined in turn by the base-collector voltage of the transistor 340 which voltage is the reference voltage across the network 336. Thus the volt-seconds absorbed by any control winding, and hence the resetting effect of the control winding, is substantially determined by the reference voltage provided by the network 336. The current in the line 110 may be several hundred times as great as the current in line 338 which controls its value. In an embodiment that was built and successfully operated, a current ratio of about 400 was obtained. The physical sizes and electrical characteristics of the transistors 340 and 342, respectively, may be proportioned according to the amounts of current to be carried.

Assuming that initially the feedback voltage is equal to the reference standard voltage, the ouput potential of the differential amplifier will be a certain predetermined value which applied to the grid of the tube 334, results in the proper value of control voltage at the line 110 to maintain the feedback voltage approximately equal to the standard reference voltage. If now the feedback voltage increases slightly, the output of the differential amplifier becomes less positive, causing the grid of the tube 334 to become less positive, reducing the current flow through the tube and decreasing the control voltage at line 110, thereby reducing the output of the magnetic amplifier. Equilibrium is restored at a value of the anode potential of tube 302 that is slightly less positive than the initial value, and just sufficient to maintain the necessary potential at the cathode of tube 334. In view of the large current amplification provided by the cascaded transistors, the net change in the current output of the differential amplifier is relatively very small. The change in output is in turn maintained by a slight difference between the grid potential of the tube 304 and the grid potential of the tube 302 in the equilibrium condition, due to amplification in these tubes. In case of a decrease in the feedback voltage below the standard value, the adjustment of the differential amplifier is in the opposite sense and likewise very small. A potentiometer 356 may be provided in the grid circuit of the tube 334 for adjusting the initial value of the control voltage in the magnetic amplifier. A cathode resistor 358 may be provided to improve balance in the differential amplifier.

The feedback network comprising the resistor 318, the capacitors 320 and 322 and the triode 324 has as one of its purposes the deactivating of the feedback effective at frequencies in the neighborhood of one-half the polyphase power line frequency. Otherwise, at this frequency the feedback would change from negative to positive with resultant instability and undesired oscillations. Such instability is due to the fact that the control effect exerted by the feedback upon the control windings in the magnetic amplifier is accompanied by a delay of one-half cycle. That is, when a change occurs in the power output of the magnetic amplifier, correction does not begin until the control half-cycle following the power half-cycle in which the change occurs. If a succession of changes occurs at the rate of one change in two full cycles, a first change, for example an increase, calls for a reduction of power. The change in control current to effect a reduction takes place in the following control half-cycle. During the succeeding power half-cycle, the reduction in power output due to the periodic change that has been assumed coincides with the reduction in power output caused by the change in control current. The reduction in power output then causes a change in control current in the direction to produce greater power output and the increase becomes effective coincidentally with the next periodic increase in power. The result is a positive feedback where only negative feedback is desired. The feedback network 318, 320, 322, 324 may be proportioned to give high attenuation to the feedback voltage at the half frequency, which is 30 cycles per second in the usual case, namely in a 60 cycle per second power system. This is done by making $$f = \frac{1}{2\pi\sqrt{R_1 C_1 R_2 C_2}}$$

where $R_1$, $C_1$, $R_2$, $C_2$, are the values of the respective network elements 318, 320, 324 (anode-cathode resistance), and 322 and $f$ is the frequency of maximum attenuation.

Feedback frequencies materially lower or higher are not materially attenuated. There is no lack of control or any runaway condition produced when a 30 cycle per second fluctuation occurs, because the fluctuation will be relatively small compared to the average value of the feedback in the line 126. This average value maintains the average value of the grid potential of the tube 304. It is only the frequencies in the vicinity of the 30-cycle per second fluctuation that are attenuated and prevented from having an appreciable effect upon the grid of the tube 304.

The feedback network also serves to damp out fluctuations which might otherwise result from sudden changes in the demand for load current as in a program involving a sudden voltage step. For example, should a sudden increase in load current be called for, the grid of tube 302 is suddenly made more negative because of a negative step impressed upon the line 313 as by the function generator. A sudden rise in anode voltage of tube 302 results, which in turn produces an increase of voltage at the grid and at the cathode of tube 334. The increased cathode voltage of tube 334 is passed along to the grid of tube 324, resulting in a drop in the anode potential of that tube. The drop in the anode potential of tube 324 is passed along by the capacitor 322 to impress a negative step upon the grid of tube 304, thereby preventing sudden and wide unbalancing of the differential amplifier during the half cycle delay before the load current of the magnetic amplifier can be changed. When the change in load current occurs, the capacitor 322 may remain charged with only slight adjustment required as the new load current value is established.

As the start of an operation such as welding, when the control voltage is in a low range, it is desired that the load current shall follow the control voltage changes as rapidly as possible. This is accomplished by having as large a momentary difference as possible between the grid potentials of the tubes 302 and 304. As the load current builds up, an increasing feedback voltage develops which progressively reduces the difference between the grid potentials of these tubes. To prevent the feedback voltage from reaching the grid of the tube 304 during the low control voltage period the normally positive signal is temporarily removed from the grid of the tube 324 by means of the diode 346. During normal operation the cathode potential of the tube 334 may vary in a range between ground corresponding to minimum or zero load voltage and about 30 volts positive corresponding to maximum load voltage. A potentiometer 360 is provided as a part of the cathode network 336, the movable arm of which potentiometer is somewhat more negative than the cathode by an amount depending upon the arc voltage, for example about three volts negative corresponding to an arc voltage of 18 volts in an illustrative case. The movable arm of the potentiometer 360 is connected through the diode 346 and the line 344 to another potentiometer 362 the movable arm of which is connected to the grid of the tube 324. Since the lower end of the potentiometer 362 is grounded and therefore at the start is more positive than the movable arm of the potentiometer 360, no current can flow through the line 344 at the start. The voltage drop in the cathode resistor 326 then places a potential upon the grid of the tube 324 to establish the initial operating condition of the tube 324.

The point at which tube 324 causes feedback through capacitor 322 may be adjusted by means of a potentiometer 360 so that this feedback occurs when the apparent resistance of the load has fallen to within the value of the arc resistance. Adjustment may be made at the potentiometer 362 to control the magnitude of the feedback signal from tube 324 with relation to the magnitude of the signal at the cathode of tube 334 to vary the stabilization effect of the feedback network.

To improve the operation of the magnetic amplifier in a number of respects, auxiliary sets of polyphase rectifiers and diodes are provided as shown in FIG. 3A. One set of rectifiers 131, 133, 135 provides a source of positive rectified three-phase current over a common line 138. Another set of rectifiers 132, 134, 136 provides a source of negative rectified three-phase current over a common line 140. These sources of rectified current are continually available and never fall to zero current, maintaining a relatively small average current which may be less than 10 percent of the maximum load current.

When the load is a welding arc or the like, the load current may occasionally fail due to the arc becoming extinguished. Absence of load current for whatever reason, may cause failure of a core to set and consequent firing of the reactor during the control half-cycle with injury or destruction of the control winding or associated components. To prevent this from happening, the rectified currents on the lines 138 and 140 are directed through the power windings of the saturable reactors during the respective power half-cycle of each reactor. As these rectified currents do not pass through the load circuit they are not interrupted when the load circuit is broken. Because the reactors operate in time-displaced phases, separate paths are provided through the respective reactor power windings. Each of these paths includes an individual resistor that acts as a substitute load and also an individual diode to insure unidirectional current flow. Thus, the line 138 branches to provide a path through a resistor 142 and a diode 152 and through the power winding of the reactor 72 in the direction to produce a flux in the power direction in the core of that reactor, the current flowing from right to left as shown in the figure. Similarly, the line branches to provide a path through a resistor 144 and a diode 154 and through the power winding of the reactor 74, and a path through a resistor 146 and a diode 156 and through the power winding of the reactor 76. The line 140 branches to provide a path through a resistor 141 and a diode 151, another path through a resistor 143 and a diode 153, and a third path through a resistor 145 and a diode 155. These paths are so directed by the respective diodes that a current may flow through the power winding of each of the reactors 71, 73, 75, from left to right during the power half-cycle of the respective reactor.

By-pass diodes 161, 163, 165, are provided to form unidirectionally conductive paths from the neutral line N1 to the cathode side of the diodes 151, 153, 155, respectively. Similarly, by-pass diodes 163, 164, 166, are provided to form unidirectionally conductive paths from the anode side of the diodes 152, 154, 156, respectively, to the neutral line. As soon as the power half-cycle starts in a given one of the reactors, for example reactor 71, current may immediately flow into the power winding 79 of the reactor from power secondary winding 41 over a circuit through the diode 151, the substitute load resistor 141, the line 140, one of the diodes 132 and 136, the neutral line and one of the power secondary windings 43 and 45 back to the power secondary winding 41. By this means, sufficient magnetizing current is assured in the reactor 71 from the beginning of its power half-cycle regardless of how small a load current may be flowing in the load circuit at the time. Furthermore, this magnetizing current flows during the initial and final 30 electrical degree portions of the power half-cycle when the main power rectifier 81 is rendered non-conductive due to the load being picked up by one of the other phases. It will be noted that the circuits shown in FIG. 3A also provide similar protection for the remaining saturable reactors. Suitable values of substitute load current in the reactors may be obtained by adjusting the resistance values of the resistors 141 through 146, which may be of the variable type.

To limit the magnetizing current supplied to a reactor through the substitute load resistor to the power half-cycle of that reactor, the above described circuits include clamping circuits to ensure that the voltage applied to the power winding of the reactor is limited to the potential difference between the phase line and the neutral line. For example, the potential at the junction of diodes 151 and 161 should not be allowed to go negative with respect to neutral. It will be noted that when the electromotive force in a given power secondary winding, for example winding 41, tends to drive current into the neutral line and the junction of diodes 151 and 161 is at a negative potential with respect to neutral, a by-pass path is opened up from neutral through the diode 161, the associated resistor 141, the line 140, and the diode 134 and thence back to the winding 41. Also, when the electromotive force in winding 41 begins to draw current out of the neutral line and the junction of diodes 154 and 164 is at a positive potential with respect to neutral, a by-pass path is opened up through the diode 131, line 138, resistor 144, diode 164 and thence to the neutral line.

Two results which are accomplished by the provision of the currents in the lines 138 and 140 may be further explained by reference to FIG. 4 which shows an illustrative hysteresis loop for one of the saturable reactors 71 through 76, inclusive. Due to the fact that the reactors may not have substantially rectangular hysteresis loops, it may not be possible to leave a reactor fully saturated at the end of the power half-cycle. For example, as illustrated in FIG. 4, at the end of the power half-cycle, the core may be left in the state indicated by the point 400, partly down the side of the loop in the reset direction, instead of at full saturation as represented by point 402.

In the absence of the auxiliary rectifiers and substitute load resistors individual to the several phases, no current would flow in the winding 79 during the first 30 electrical degrees of the power half-cycle. When the current then came on, it would take time for the flux to be increased from the value at point 400 to the saturation value shown by the horizontal line through the point 402. Thus, even in the absence of any resetting of the flux during the previous control half-cycle, it would not be possible to obtain full load from the reactor winding 79. With the auxiliary rectifier 151 and load resistor 141 connected as shown, magnetizing current flows through the winding 79 during the entire power half-cycle. This current may be adjusted so that during the first 30 electrical degrees of the power half-cycle the state of the reactor is moved over a portion of a minor hysteresis loop 401, to a point such as 412 at which the core is saturated. Consequently, even though the hysteresis curve is not flat-topped, the circuit acts substantially as if the hysteresis curve were so constituted, as would be the case for an ideal magnetic material having a substantially rectangular hysteresis loop.

It has been designed that sufficient magnetizing current may be supplied to the reactor during the power half-cycle to change the flux from minimum value to saturation, thus causing the reactor to reach the saturation level during each power half-cycle, even though the core has been reset the maximum amount during the preceding control half-cycle. Thus, firing of the reactor is positively assured during each power half-cycle for all values of initial flux level from saturation to maximum reset. Furthermore, the core is always brought to substantially the same degree of saturation at the end of the power half-cycle so that resetting always starts from substantially the same flux value. Consequently, the reset value of the flux which is attained at the end of the control half-cycle is determined by the amount of current passed through the control winding during that half-cycle.

Referring again to FIG. 4, during the previous or control half-cycle, the state of the core will in general have been changed from the state of near saturation at the point 402 along a path of the type indicated by line 404 to some point such as 406 on the hysteresis curve, the exact position on the curve being determined by the amount of resetting. When the control half-wave of electromotive force falls to zero, the core is left in a state such as that represented by the point 408. At the start of the power half-cycle, the applied voltage at line 138 or line 140 causes the current in the core winding to be shifted very rapidly to the state indicated at point 410 where the current begins to reverse the flux at an accelerated rate. After a measured portion of the power half-cycle has elapsed, the core is brought to the state indicated by point 412 where it becomes saturated. Thereupon the reactor fires, drawing a maximum current represented by a point 414 which current may be several hundred times as great as the minimum current required to saturate the core. As the power electromotive force subsides, the state of the core is brought back to the point 400.

It will be noted that, should the reactor fail to fire on the power half-cycle, the core state would be left at point 408 at the beginning of the succeeding control half-cycle. This control half-cycle would then drive the flux further down in the vertical direction, and, if the reactor continued to fail to fire, the core state would reach saturation in the negative direction, indicated by point 416, and the reactor would fire during a control half-cycle. This firing would be likely to damage or burn out the control winding or associated components, since this winding and series components are not ordinarily designed to carry anything like the full power current.

It will also be noted that firing during the control half-cycle may also occur even though only very slight resetting by the control winding takes place, unless provision is made to end the power half-cycle always substantially at the same degree of saturation. This is because by ending the power half-cycle at a point such as point 400, the reactor has in effect reset itself by the amount of the difference in the flux values at the points 402 and 400. If a succession of power half-cycles then occur in which the reactor does not fire, the core goes through a minor hysteresis loop including a portion indicated by line 418, ending the half-cycle at a point 420, followed by further downward drops until negative saturation is reached, causing firing through the control winding. Under such conditions as those described, the current in the lines 138 and 140 serves to prevent the reactor from firing on the control half-cycle.

Another function of the auxiliary current supply provided over the lines 138 and 140 is to aid in offsetting unstabilizing effects of negative resistance of the load, as is present, for example, in an electric arc at relatively low current operation. FIG. 5 shows an illustrative voltage-current load characteristic curve 500 of an arc. At the higher current values, the arc voltage increases with current increase as in the case of any positive resistance load, the point 502 being a representative point on the positive resistance portion of the curve 500. At the lower current values, the curve 500 flattens off and then curves upward, exhibiting a negative resistance over a region including a representative point 504. It will be evident that if constant current control of the arc is attempted at a point such as the point 504, the feedback will be positive and will result in instability and oscillations in the load circuit. For example, if the current in the arc decreases, the feedback system will call upon the magnetic amplifier to increase the average voltage of the pulses which it supplied to the load circuit. This will result in a higher voltage being impressed upon the arc, which will still further reduce the current in the arc because of its characteristic, the opposite of what is desired. The decreased arc current will cause the feedback system to call for a further increase in the impressed voltage, etc., so that the arc may be rapidly extinguished. On the other hand, an initial increase in the arc current will call for a decrease in the voltage impressed upon the arc from the magnetic amplifier, thereby further increasing the arc current, a process that may cause burning of the workpiece. Another result may be a sustained electrical oscillation at some resonant frequency of the electrical system.

To provide the bulk of the increased voltage necessary to maintain the arc at low current values, one or more auxiliary power supplies may be employed. For one of these auxiliary supplies, the line 138 may be connected through a load resistor 170 and a switch 172 to the positive side of the load circuit, as at a point between the cathode of the diode 122 and the lefthand terminal of the resistor 112; the line 140 being connected through a loading resistor 174 and a switch 176 to a point in the load circuit between the anode of the diode 121 and the lefthand terminal of the inductance coil 118. By proportioning the load resistors 170, 174, and the open circuit voltage on the lines 138, 140, the auxiliary supply may be given a load line 506 rising somewhat more steeply than the curve 500. The point 508 represents the open-circuit voltage of this supply and the point 510 represents its short-circuit current. While the lines 138 and 140 are shown as deriving their voltage from the outer terminals of the power secondary windings 41, 43, 45, it will be evident that these windings may be tapped at intermediate points to provide the desired voltage for the lines 138, 140, or that additional turns may be provided on these windings. Furthermore, separate windings may be employed for the auxiliary supplies, as desired. The latter provision is made in the system shown in FIG. 3A to obtain a second auxiliary supply having a load line 512 approximately parallel to a portion of the curve 500. The auxiliary secondary winding 52 has its outer terminal connected to oppositely poled diodes 182, 185, similar pairs of diodes 184, 181, and 186, 183, being provided for windings 54 and 56 respectively. The diodes 182, 184, 186 are connected in common to a positive supply line 188 which is connected in turn through a load resistor 192 to the switch 172. The diodes 181, 183, 185 are connected in common to a negative supply line 190 which is connected in turn through a load resistor 194 to the switch 176. The open-circuit voltage and short-circuit current points for the line 512 are shown at 514 and 516 respectively. The auxiliary supplies may be cut in or out as desired by means of the switches 172 and 176.

To illustrate the manner in which the auxiliary supplies cooperate with the magnetic amplifier to supply increased voltage to the arc at low currents without causing instability in the feedback system, typical voltage-current lines 518, 520, 522, 524, 526, 528 and 530 are shown in FIG. 5 for various values of the voltage supplied to the load by the composite power supply comprising the magnetic amplifier and the auxiliary supplies. These voltage-current lines are numbered in descending order of voltage. Due to the action fo the auxiliary supplies, the lines bend upward at the left, becoming approximately parallel to the line 506 pertaining to the auxiliary source of the higher open circuit voltage. If it were not for the effect of the auxiliary sources, the voltage-current lines would be substantially horizontal over their entire length, the line 518, for example, continuing toward the left as shown by the dotted portion 519. Similarly, the line 520 would continue as indicated by the dotted line 521 and the line 522 as indicated by the dotted line 523. It will be noted that the straight lines 518—519, 520—521 and 522—523 each intersects the curve 500 in two points. Of these points of intersection, the points 532, 534 and 536 on the positively sloping portion of the curve 500 are points of stable operation at which the feedback system operates normally, calling for less input voltage when the current increases and more input voltage when the current decreases. A point such as point 539, however, on the negatively sloping portion of the curve 500 is a point of instability as noted above. Due to the fact that the lines 518, 520, etc., bend upwardly to the left more steeply than the curve 500, lines 518, 520 and 522 do not cross the curve 500 a second time and the lines 524, 526, 528 and 530, which if they continued horizontally would not cross the curve 500 at all, do cross the curve 500 at the points 538, 540, 542, and 544 respectively. Furthermore, the curve 500 crosses all the voltage-current supply lines of the composite supply in descending order of voltage as the curve 500 is traversed from right to left. Consequently, as the current in the load decreases, and the feedback calls for lower and lower voltage from the magnetic amplifier, the composite supply uniformly provides decreasing current at the voltage that the load requires.

No instability occurs during the operation of the load over any portion of the curve 500 because at no point is the magnetic amplifier called upon to supply less current while at the same time supplying more voltage. Similarly, during an increase in current requirements, the magnetic amplifier is never called upon to supply more current while at the same time supplying less voltage. The magnetic amplifier is free to operate normally, as if it were at all times serving a positive resistance load. When less current is required, in the region to the left of the point 536, the magnetic amplifier responds by supplying less current and less voltage, one or more of the auxiliary sources supplying the necessary additional voltage and a portion of the current.

At low currents, the magnetic amplifier is stopped down to a point where it becomes conductive only during a small fraction of the power half-cycle at the very end of the half cycle. During the quiescent portion of the power half-cycle, the load voltage and current are being supplied solely by the auxiliary supply or supplies. The brief power pulse from the magnetic amplifier then serves to bring the average current and voltage of the load up to the desired value.

FIG. 5 also serves to point out a fundamental difference between current control and voltage control of a load such as an arc which exhibits negative resistance over a portion of its load curve. While the voltage regarded as a function of current is single-valued, it will be noted that the current as a function of voltage is double-valued. For example, if as shown in FIG. 5, the illustrative operating points 536 and 539 are located on a constant voltage line 522—523, these operating points are not both stable. As above noted, it is found that the point 539 is unstable. The system if operated momentarily at point 539 will rapidly change over to a state represented by the point 536 where the operation is stable. Thus, when the load has this type of characteristic curve, regulation may be applied in the negative resistance region to the load current but not to the load voltage. Accordingly, the auxiliary voltage supplies herein described are suitable for use with current feedback for achieving current regulation but not with voltage feedback. When voltage feedback is to be used, the switches 172 and 176 should be open.

FIGS. 6A and 6B show an illustrative form of a general control and starting system suitable for use with the system shown in FIGS. 3A through 3D. In this figure, 602, 604, 606 are conductors connected to the respective lines of a polyphase power transmission system, for example, a three-phase, 60 cycle, 460 volt supply. Polyphase lines 608, 610, 612, are arranged to be connected to the lines 602, 604, 606, respectively, by way of contacts operable by a relay winding 614. A cooling fan 616 may be connected to the power lines 608, 610, 612 and may be provided with a reversing switch as shown. One phase of the power line system 602, 604, 606, is shown connected to the primary winding of a transformer 618, a switch 620 being provided in the secondary circuit. Upon closure of the switch 620, power is supplied to the primary winding of a transformer 622 and to a pilot light 624 associated therewith to indicate when this power is on. The transformer 622 is provided with three secondary windings 626, 628, 630, which supply power to the power supply unit of the program function generating apparatus, which apparatus is immediately activated when switch 620 is closed and begins to warm up to normal operating condition. To insure sufficient warming up of the function generating unit before welding or other use is started, a delay device is provided in the form of a heating resistor 632 which heats a bimetallic thermostatic element 634 which when heated sufficiently touches a contactor 636. The heater 632 obtains current through the switch 620 and a normally closed contact 638 operable by a relay winding 640. When the contact is made between the members 634 and 636, a current path is extended through the winding 640, thereby closing a normally open contact 642 which forms a parallel connection between the elements 634 and 636 and holds the winding 640 in energized condition as the winding opens the contact 638, de-energizing the heater 632.

When the delay period has elapsed and the relay 640 has been locked in the operated condition as above described, power is extended through the contact 642 to the primary winding of a transformer 644, which supplies power to a direct current sensing arrangement in the welding circuit. Power is also supplied through a normally closed pushbutton 646 to a pilot lamp 648 to indicate that the warm-up period has been completed. Power is now available through the pushbutton 646 to a normally open circuited pushbutton 650 which, when pushed for momentary contact extends power to the relay winding 614 which turns on the polyphase power and locks itself in the operated condition through a normally open contact 652, lighting a pilot light 654 indicating that power has been supplied to the magnetic amplifier for the welding apparatus or other load circuit. In the following, except as otherwise noted, the load circuit will be considered to comprise a welding torch or the like.

When a lamp 654 is lighted manual welding may be carried on under control of a pushbutton or gun trigger 660 (FIG. 3B) embodied in the welding torch. Current passes through the device 660 by way of a normally closed contact 662 associated with a relay winding 658 to energize a relay winding 664 which operates to close a normally open serial contact 666 which is wired to the welding circuit and connects the welding current to the arc. Another normally open contact 668 operable by the winding 664 is not used during manual welding. An additional normally open contact 659 (FIG. 3D) is closed to condition a thyratron tube 873, and a normally closed contact 661 is opened to condition a circuit for charging one of a pair of capacitors 848, 850. The position of the contacts 659 and 661 is shown in FIG. 3D and the functions performed by these contacts will be more fully explained below.

When the lamp 654 is lighted, program operation may be started by closing a switch 656, thereby energizing the relay winding 658. The winding 658 transfers the contact 662, thereby deactivating the pushbutton 660 on the welding tool with respect to control of the winding 664. The winding 658 closes a normally open contact 670 which extend power to a pushbutton 672 by means of which a relay winding 674 may be operated. The operation of the relay winding 674 closes a normally open contact 678 which completes a circuit through the closed contact 670, a normally closed contact 680 in a timer unit 682, and the closed portion of the transfer contact 662 to operate the relay winding 664. The winding 664 when operated completes the welding circuit and at the same time closes the contact 668 which completes a holding circuit for this winding through the closed portion of the transfer contact 662.

The relay winding 658 also operates a transfer contact 663 which is wired to the function generator shown in FIG. 3D where it serves a function in connecting a constant voltage source to the input of the differential amplifier for manual operation or a program function source to the amplifier for program operation.

While the pushbutton 672 is held down, a normally open contact 684 is closed by the winding 674 to reset the timer 682 to begin a timing cycle. At the same time, another normally open contact 686 is closed by winding 674 to render conductive the righthand side of a multivibrator in the function generator. Also, a normally closed contact 688 is opened by the winding 674 to insure that the lefthand side of the multivibrator is cut off. Upon release of the pushbutton 672, the contact 688 makes and the contact 686 breaks, thereby reversing the multivibrator and generating a negative step at the righthand side thereof which determines the starting condition of the program.

The timer 682 closes a normally open contact 690 after an initial measured time interval, whereupon the multivibrator is flipped to its alternate state, to make a positive step which determines the start of the second portion of the program. At the end of a further measured time interval, the timer 682 opens the normally closed contact 680, breaking the holding circuit of the relay winding 664 and thereby breaking the welding circuit and terminating the welding operation. The de-energization of the winding 664 also results in the opening of contact 659, breaking the anode circuit of the thyratron 873; and in the closing of contact 661, discharging capacitor 848 or 850.

In emergency or otherwise, welding may be stopped and the main power may be disconnected at any time by pressing the pushbutton 646.

The true ground or neutral line 607 of the polyphase transmission line may be connected directly to a chassis ground line 609 of the starting and control system as shown in FIGS. 6A and 6B, while the signal ground line 307 may be isolated from the chassis ground by a capacitor 683. By this provision it is made possible to have either side of the load circuit connected to the workpiece in the case of a welding operation.

FIG. 7 shows an illustrative program function together with switching functions employed in setting up the program function. Two stages are illustrated, during the first of which the function rises abruptly, with or without an initial spike, as desired, and then gradually increases to a maximum. The program is shown as starting at time $t_1$ and continuing in the first state until time $t_2$ when the function drops abruptly and then tapers off to zero by time $t_3$. The initial spike is shown at 702, the initial step at 704 and the gradual rise, the step down and the taper at 706, 708 and 710, respectively. The graph 712 represents the output function of a multivibrator which is included in the function generator 810 to be described in greater detail below. The graph 714 shows the switching action of the contact 690 in the timer 682 and the graph 716 shows the switching action of the contact 680 in the timer. The time intervals $t_1$ to $t_2$ and $t_1$ to $t_3$ may be varied by adjustments which are part of the timer. Suitable timers are available on the market, for example under the trade name of Dekatron Timer, Model PW-3, from Post Machinery Company, Beverly, Mass.

FIGS. 3C and 3D show details of an illustrative form of a function generator together with a filtered rectified power supply, the latter serving the function generator, the differential amplifier and associated circuits.

Lines from winding 630 in FIG. 6A supply single phase power to a full wave rectifier 802, the cathodes in the rectifier tubes being heated by current coming from winding 628. Heaters for other thermionic tubes in the apparatus are supplied with heating current from winding 626. As indicated above in connection with FIGS. 3A and 3B, neutral line N2 from the flux-resetting secondary winding of the polyphase power transformer is connected in common with the signal ground line 307. The line 307 connects to the midpoint of the winding 630 of the power supply. A suitable filtering circuit for the rectifier 802 is shown at 804. The filter feeds into the positive supply line 806, the negative supply line 808 and the signal ground line 307. The voltage on the lines 806 and 808 may be plus and minus 150 volts respectively with reference to the ground line 307.

A multivibrator 810 comprising thermionic tubes 812 and 814 is provided. The anode of the tube 812 is coupled to the grid of the tube 814 through a resistance-capacitance network 816 and the anode of tube 814 is coupled to the grid of the tube 812 through a similar network 818 in the usual manner. The tubes 812 and 814 are provided with anode loading resistors 820 and 822, respectively. The two sides of the multivibrator are each provided with a trigger tube, the trigger 824 controlling the tube 812, and the trigger 826 controlling the tube 814. Either trigger is capable of rendering conductive the multivibrator tube on its respective side of the multivibrator under the control of the grid potential on the respective trigger. As is the normal function of a multivibrator, when either multivibrator tube is rendered conductive the other multivibrator tube is rendered non-conductive. The normally closed contact 688 operable by the relay winding 674 is connected in conjunction with the capacitor 828 in a control circuit for the grid of the trigger 824. Two independent control means are provided for the grid of the trigger 826, one being the normally open contact 686 operable by the relay winding 674, and the other being the normally open time-controlled contact 690 in the timer 682 in conjunction with a capacitor 830. The output at the anode of tube 812 and grid of tube 814 is applied by way of a voltage divider to the grid of a cathode follower tube 832 the output of which in turn is made available on a line 834. The output of tube 812 is also impressed upon a line 836. The line 834 is connected to an intermediate point in a circuit branch comprising a resistor 354 and a plurality 838, 840, 842, 844, of switching diodes all of which have their conductive direction upward in the figure, the line 834 being connected to the junction of the anode of diode 840 and the cathode of diode 842.

Adjustable resistance-capacitance charging and discharging circuits are provided under the control of the line 834. For this purpose a switch 846 provides a choice of capacitors 848 and 850 of different capacities and rheostats 852 and 854 provide means for varying the charging and discharging rates respectively of the selected capacitor.

A tube 851 is provided which cooperates with the tube 832 to furnish upward and downward step functions under the control of the multivibrator. Potentiometers 853 and 855 may be used to control the height of the upward and downward steps, respectively. Unidirectional conductors, shown as diodes 857, 859, 861, 863, are provided for isolating the current for one step from the current for the other. Paths for these currents are provided between a potentiometer 865 in the cathode circuit of the tube 851 and a potentiometer 867 in the cathode circuit of the tube 832. A voltage limiting unidirectional conductor, shown as a diode 869, is connected between the movable arms of the potentiometers 853, 855, and the movable arm of a potentiometer 871, which latter potentiometer is arranged to be controlled in potential as by a thyratron tube 873, which in turn is controlled by the multivibrator.

A cathode follower 860 is provided for mixing the step function wave with a gradually rising or falling wave from the capacitor charging and discharging circuit, the output of the tube 860 being connected through potentiometers 862 and 864 to the grid of the tube 302 in the differential amplifier over the line 313.

The line 836 is connected to the grid of a cathode follower 870. The output of the tube 870 is connected through a differentiating network comprising a capacitor 872 and a rheostat 874 to provide an initial spike of voltage. The output of this cathode follower is superimposed upon the line 313 through a unidirectional conductor shown as a diode 876. A switch 868 is provided by means of which the spike generation feature may be eliminated when not wanted.

A switch 884 is provided in the grid circuit of tube 860 for selectively applying to the grid either a wave from the tube 851 or a wave from some external source (not shown) which may be connected to terminals 888 across a resistor 890.

The transfer contact 663, operable by relay winding 658, serves to connect to the grid of tube 860 either the program function wave from the switch 884 or an adjustable reference voltage from a potentiometer 316. The constancy of this voltage may be assured by means of a reverse-current diode 352 in parallel connection with the potentiometer 316. The diode is of the type which breaks down at a definite voltage to pass current in the reverse-current direction, upward in FIG. 3C, thereby imposing an upper limit upon the voltage across the potentiometer 316. A resistor 354 together with the diodes 838, 840, 842, 844, 352, and potentiometer 316 forms a voltage divider across the negative supply that insures that the voltage across the potentiometer will not fall below the limit set by the diode 352.

In the operation of the arrangement shown in FIGS. 3C and 3D, the trigger tubes 824 and 826 that control the multivibrator are both normally non-conductive because their grids are each connected to a point 821 on a voltage divider comprising resistors 823 and 825 connected serially between the ground line 307 and the negative line 808. It will be noted that the cathodes of the tubes 824 and 826 as well as of the tubes 812 and 814 are connected directly to the ground line. When the program start pushbutton 672 is being held pressed down, the upper side of the capacitor 828 as shown in the figure is placed at ground potential through a connection over a resistor 829, due to contact 688 now being open. At the same time, the grid of the tube 826 is grounded through the closed contact 686 rendering the tube conductive. The tube 826 draws anode current through the anode load resistor 822, thereby dropping the anode potential of the tube 814 and simultaneously dropping the grid potential of the tube 812, cutting off the latter tube. The cutting off of the anode current in the tube 812 raises the anode potential of the tube 812 and also the grid potential of the tube 814, ensuring that the tube 814 becomes conductive. The multivibrator is thus brought to a standard initial condition in which the left hand side is cut off and the righthand side is conducting. Upon the release of the pushbutton 672, the contact 686 opens and the contact 688 closes, the latter contact connecting the upper side of the capacitor 828 to a point 827 on the positive side of the power supply, sending a positive pulse to the grid of the tube 824. Resultant anode current in the tube 824 flowing through the anode loading resistor 820 lowers the anode potential of the tube 812 and the grid potential of the tube 814, cutting off the tube 814. The cutting off of the anode current of the tube 814 raises the anode potential of that tube and also the grid potential of the tube 812, rendering the tube 812 conductive. Thus, by the release of the pushbutton 672 the multivibrator assumes the state in which the lefthand side is conducting and the righthand side is cut off. In this shift in the condition of the multivibrator the righthand side of the multivibrator executes a downward step in potential. The downward step is transmitted through the cathode follower tube 832 to the line 834, dropping the potential of this line below ground potential, thereby enabling the capacitor 848 or 850 to start charging its upper side positive through a circuit from the ground line 307, the capacitor, the rheostat 852, the diode 842, the line 834 and the cathode circuit of the tube 832 to the negative side of the power supply. The charging rate depends upon the choice of capacitor and the setting of the rheostat 852. A long or a short charging time may be selected by means of the switch 846 and a specific adjustment of the charging time may be made by means of the rheostat. The potential on the negative side (lower side) of the capacitor is impressed upon the grid of the tube 851.

In program operation, before pushbutton 672 is pressed, the normally closed contact 661 controlled by the winding 664 short-circuits the capacitors 848, 850, assuring that the selected capacitor is fully discharged before the program starts. Energization of the winding 664 when pushbuton 672 is pressed removes the short circuit from the capacitors.

The negative step applied to the grid of the tube 832 by the multivibrator reduces the anode current of the tube and thereby lowers the potential at the movable arm of the potentiometer 867. This causes a small but abruptly starting current through tube 851, the diode 859, potentiometer 853, diode 857, and potentiometer 867, producing a voltage step in the potentiometer 853. This step is added to a slope voltage from the potentiometer 865 and may be applied to the grid of tube 860 when the switch 884 is in the lower position and the transfer contact 663 is making contact at the left. It will be noted that in the circuit shown the slope voltage and the step voltage are mutually aiding, both tending to drive the grid of tube 860 more negative. The thyratron 873 is in the unfired condition and the diode 869 has its cathode connected to the potentiometer 871 which is at a positive potential with respect to the potential at the anode of the diode 869 as long as the thyratron remains unfired. At this time, therefore, the diode 869 and potentiometer 871 have no effect upon the potential on the grid of the tube 860.

When the switch 884 is in the upper position, a wave from an external source may be connected to the terminals 888 and thereby connected to the grid of the tube 860. Whatever wave or source is connected to the grid of the tube 860, a replica thereof may be transmited to the input of the differential amplifier by means of the potentiometer 864, and the line 313.

As a further result of the releasing of the pushbutton 672 a negative step is transmitted over the line 836 to the grid of tube 870 causing the anode current of that tube to be abruptly reduced. Before the current reduction, the capacitor 872 has a positive charge on its righthand side inasmuch as the cathode of the conducting tube 870 is at a positive potential and the righthand side of the capacitor is connected to ground. When the current in the tube 870 is reduced, the righthand side of the capacitor 872 is abruptly reduced in potential, drawing current through the rheostat 874 and thus abruptly reducing the potential of the line 313. A negative spike is thus generated, the width of which may be adjusted by varying the charging resistance by means of the rheostat 874. An adjustment of the height of the spike may be made at a rheostat 878.

When the timer 682 has measured out the time interval from $t_1$ to $t_2$, it closes the contact 690, thereby connecting the positively charged point 827 through the contact 690 and the capacitor 830 to the grid of the tube 826, causing that tube to become conductive with a resulting shift of the multivibrator to the condition in which the lefthand side is cut off and the righthand side is conductive. An upward step is thus produced which is transmitted to the line 834. The raising of the potential of the line 834 initiates a reversal of charge of the capacitor 848 or 850 over a path from the positive line 806 through the tube 832, the line 834, the diode 840, the rheostat 854 and the capacitor 848 or 850 to ground, providing after inversion the desired downward slope 710 shown in FIG. 7. The rate of downward slope may be varied by means of the rheostat 854.

The upward step from the multivibrator also raises the potential of the movable arm of potentiometer 867, causing a current to flow from the tube 832 through the diode 861, the potentiometer 855, the diode 863 and the potentiometer 865, providing a step function upon the grid of tube 860 of opposite polarity to the step function previously described.

To limit the value of potention to which the grid of the tube 860 may rise, an adjustable negative potential is established upon the potentiometer 871 when the thyratron 873 is in the fired condition. The thyratron is fired by a positive pulse through a capacitor 833 when the cathode of tube 832 is raised in voltage by the upward step from the multivibrator. With the potentiometer 871 thus made negative with respect to the anode of the diode 869, the diode limits the final level of the grid voltage of the tube 860 to a desired value selected by means of the potentiometer 871.

The diode 886 decouples the spike from tube 870 to line 313 when the multivibrator develops its upward step.

When the timer 682 has measured out the time interval $t_1$ to $t_3$, the contact 680 is opened. The opening of contact 680 breaks the operating circuit of the relay winding 664 the contact 666 of which disconnects the load from the output of the magnetic amplifier, stopping the welding or other operation, as above noted. The contact 659 opens to extinguish the thyratron and the contact 661 closes to ground the capacitor 848 or 850 to condition the apparatus for the start of a new program cycle.

FIG. 8 shows a pick-up circuit for current feedback together with means for combining current and voltage feedback in any desired proportions. For picking up current feedback, a form of direct current sensing circuit 900 employing saturable reactors 902 and 904 is provided. The positive power conductor 905 from the output of the power amplifier 22 is coupled to both reactors, forming a single-turn secondary winding for each reactor. Primary windings 906, 908, for reactors 902 and 904 respectively, are provided and each may have as many as 3000 turns or more. The exact ratio of turns of primary and secondary windings is not critical, however, and other numbers of turns on either winding may be used, provided they can support the source voltage under zero direct current load conditions. Single phase power may be supplied to the primary windings 906 and 908 from the secondary winding of the transformer 644 (FIG. 6A). A full wave rectifier is provided comprising diodes 910 and 912 and rheostats 914 and 916, a rectified current output therefrom being connected to a reversing switch 918 and thence to a potentiometer 920. The movable arm of the potentiometer 920 is connected to the movable arm of the voltage feedback potentiometer 124 by a connection 922. A series resistor 924 may be provided to determine a limited range of variation for the potentiometer 124. A shunted ammeter 926 is shown in series with the load circuit for measuring the load current. A loan in the form of a welding arc is represented at 928. A voltmeter 930 for measuring the load voltage is connected across the load circuit. The feedback line 126 is connected to the lower end of the potentiometer 920.

In the operation of the circuit shown in FIG. 8, the amplifier 22 supplies a rectified power current from its positive output terminal to a line 905 which is coupled to the saturable reactors 902 and 904 and thence to a load device such as the arc 928, the contact 66 when closed, and the smoothing inductance 118 to the negative terminal of the amplifier.

The direct current sensing circuit transformer 900 produces in the potentiometer 920 a voltage substantially proportional to the current in the line 906. The component of flux produced in the reactor 902 by the current in the line 905 is assumed to be in the direction represented by the upper clockwise arrow within the core of the reactor. The component of flux produced in the reactor 904 by the current in the line 905 is then represented by the upper clockwise arrow within the core of that reactor. The windings 906 and 908 are relatively so poled that when the component of flux produced in the reactor 902 by the winding 906 is counterclockwise the component of flux produced in the reactor 904 by the winding 908 is clockwise. It follows that when the component of flux produced in the reactor 902 by the winding 906 is clockwise the component of flux produced in the reactor 904 by the winding 908 is counterclockwise. The lower solid arrows in the cores of the reactors represent the first condition and the dotted arrows represent the second condition.

The proper measuring range of the device 900 begins when the current in the line 905 is sufficient to saturate both reactors 902, 904. It will be assumed therefore that in the absence of power in the windings 906 and 908 both reactors are saturated. During the power half-cycle when the flux produced in the reactor 902 by the winding opposes the flux produced by the line 905, the current in the winding 906 is limited by the law of equal ampere-turns to an average value determined by the current in the line 905, substantially independent of the voltage impressed upon the winding by the transformer 644. The current in the winding divides between the rheostat 914 and the path through the diode 910 to the potentiometer 920. During this power half-cycle, a current flows through the rheostat 916 and the winding 908. This current aids the line current, driving the reactor 908 further in the direction of saturation, and is limited only by the resistances in its path. As this current cannot flow through the potentiometer 920 on account of the oppositely poled diode 912, the current has no effect upon the measurement. During the next half-cycle the current in the winding 904 is limited to an average value determined by the current in the line 905, which current flows through the rheostat 916 and also through the diode 912 and through the potentiometer 920 in the same direction as the current through the diode 910 in the previous half-cycle. The average current through the potentiometer 920 is thus substantially proportional to the current in the line 905.

FIG. 9 illustrates the approximate wave forms of the voltage waves produced in the circuit 900 and potentiometer 920. The partly dotted sinusoidal curve 952 represents the voltage impressed by the transformer 644 upon one of the windings and the curve 954 the voltage impressed upon the other winding. The solid curves 956 and 958 respectively represent the voltage waves impressed by the windings 906 and 908 upon the rheostats 914 and 916 respectively. The horizontal portions of the curves are due to the limiting effect of the cores upon the currents in the respective windings. Because of the inductive effect of the windings, the limiting current continues after the impressed voltage has reversed and until the flux in the core stops changing. The curves 956 and 958 repeat themselves periodically and are 180 degrees out of phase with each other.

FIG. 10 illustrates the combined voltages delivered to the potentiometer 920. The horizontal portions of the curves 956 and 958 merge to form a substantially constant voltage represented by a horizontal line 960. The value of the voltage is representative of the value of the direct current in the line 905. The rectifiers 910 and 912 respectively eliminate the negative portions of the voltage waves.

The movable arms of the potentiometers 920 and 124 are directly connected so that the sum of selected voltages from the two potentiometers may be combined at line 126 with respect to the line 307. By means of the reversing switch 918, the polarity of the voltage across the potentiometer 920 may be reversed so that the voltage across the potentiometer 920 may be either added to or subtracted from the voltage across the potentiometer 124. The combined voltage is that existing between the line 126 and the ground line 307.

Voltage feedback without current feedback may be selected by setting the movable arm of the potentiometer 920 at the bottom position as shown in the figure. The movable arm of the potentiometer 124 may then be set in any position from minimum voltage feedback at the top in the figure to maximum voltage feedback at the bottom.

Current feedback without voltage feedback may be selected by setting the movable arm of the potentiometer 124 at the top. The movable arm of the potentiometer 920 may then be varied from minimum current feedback at the bottom to maximum at the top.

The combination of voltage and current feedback may be described by the equation $$F = k_1 v \pm k_2 I$$

where F is the total feedback, $v$ is the maximum voltage feedback, I is the maximum current feedback, and $k_1$ and $k_2$ represent constants of proportionality. If $k_1$ is zero, the feedback is all current feedback and constant current control is effected. Various values of $k_2$ then represent different values of constant current. In FIG. 11 a number of constant current lines 1102, 1104, 1106, 1108, are shown plotted on a voltage-current graph. If $k_2$ is zero, constant voltage control results. Constant voltage lines 1110, 1112, 1114, are shown in FIG. 11 for various values of constant voltage. By making $k_2$ negative while $k_1$ is positive, rising characteristics such as shown at 1116 may be obtained, the open circuit voltage and the slope depending upon the relative values of $k_1$ and $k_2$ and the input voltage at line 313. Drooping characteristics such as shown at 1118 may be obtained by making $k_1$ and $k_2$ both positive.

A drooping characteristic is useful, for example, in automatic welding where the torch is held at a fixed distance from the work and a consumable electrode is machine fed to the torch. If the electrode feed is too slow, the arc tends to lengthen and take increased voltage. The drooping characteristic reduces the current as the voltage increases, thereby slowing down the consumption of the electrode. On the other hand, if the electrode feed is too fast, the arc shortens and takes less voltage. The drooping characteristic provides increased current which burns the electrode down faster. Thus the arc length tends to be constant regardless of changes or inaccuracies of the electrode feed rate.

In using the function generator in program welding, $k_1$ may be set at zero to give current control independent of voltage. The potentiometer 920 will be set for maximum current and the feedback system will vary the load current to follow the function provided by the function generator.

While the invention has been described and shown with special reference to a welding machine, the invention is not to be understood as limited to welding. It may be used, for example, for motor speed control, in which case, voltage control is appropriate and $k_2$ may be set at zero. The feedback will then vary the output voltage according to a function provided by the function generator.

For manual welding or other cases where a program is not used, the reference standard voltage may be used in place of a function from the function generator and the values of $k_1$ and $k_2$ may be selected accordingly to the requirements of the work.

It will be evident from the foregoing that the regulated power supply described and shown herein has utility either with or without the function generating feature.

In an embodiment that has been built and successfully operated a setting of 15 volts, near the top of potentiometer 316 with a pure resistance load, corresponds to approximately 300 amperes load current and each reduction in a setting in a multiple of 3 volts corresponds to a current decrease of approximately 60 amperes in the load. Intermediate values are obtainable at all intermediate settings. Under conditions of constant current control, substantially constant load current may be maintained over the entire range from short circuit at the load to open circuit at the load.

While an illustrative form of apparatus and a method in accordance with the invention has been described and shown herein, it will be understood that numerous changes may be made without departing from the general principles and scope of the invention.

I claim:

1. In a magnetic amplifier-rectifier, in combination, a saturable reactor, a power source, a power winding for said reactor, a circuit path through said winding, said path including a unidirectional conductor determining the direction of current flow through said winding and said path including said power source and a load device subject to circuit interruption, and a power by-pass through said power source and said power winding and passing around said unidirectional conductor and said load device, said by-pass including said power winding and a load simulating resistor and including a unidirectional conductor determining the direction of current flow in said by-pass to be the same as the direction of current flow through said power winding.

2. In a polyphase magnetic amplifier-rectifier, in combination, a polyphase power source, a plurality of saturable reactors each individual to one phase, individual power windings for said reactors, a circuit path from said power source through each said winding, each said path including a unidirectional conductor individual to the path, a common load circuit connected to said power source by way of a plurality of said windings, said load circuit including a load device subject to circuit interruption, a plurality of power by-pass circuits connected to said power source and each individual to a single phase, each said by-pass shunting the combination of the common load circuit and the individual unidirectional conductor in one of said first mentioned circuit paths, each said by-pass circuit passing through a respective power winding and including a unidirectional conductor individual thereto and a load simulating impedance element individual thereto, each said last mentioned unidirectional conductor determining the direction of current flow in the individual by-pass circuit to be the same as the direction of current flow through the power winding to which the by-pass circuit is connected.

3. In a polyphase amplifier-rectifier, in combination, a polyphase power source, a load circuit having a positive side and a negative side, a plurality of reactors each having a power winding, a first group of said power windings, individual connections connecting through the power windings in said group from said power source to the positive side of the load circuit, said connections each including a unidirectional conductor directed toward the load circuit, a second group of said power windings, individual connections connecting through the power windings in said second group from the negative side of the load circuit to the power source windings in said second group, each connection in said last mentioned group of connections including a unidirectional conductor directed away from the load circuit, an auxiliary source of polyphase rectified current, individual paths from the positive side of said auxiliary source, each said path including a loading element and a unidirectional conductor directed away from said auxiliary source, each said path connecting said positive side of said auxiliary source to a different one of the power windings in said second group in such direction as to provide current in the respective power winding in the direction away from the negative side of the load circuit, and individual paths to the negative side of said auxiliary source, each said path including a loading element and a unidirectional conductor directed toward said negative source, each said path connecting a different one of the power windings in said first group of power windings to said auxiliary source in such direction as to provide current in the respective power winding in the direction toward the positive side of the load circuit.

4. In a magnetic amplifier-rectifier, in combination, a power source, a saturable reactor, a power winding for said reactor, a circuit path connecting said power source through said winding, said path including a unidirectional conductor determining the direction of current flow through said winding and said path including a load device subject to circuit interruption, a first by-pass through said power source and said power winding and around said unidirectional conductor and said load device, said by-pass including a load simulating resistor and a unidirectional conductor determining the direction of current flow in said by-pass to be the same as the direction of current flow through said power winding, and a second by-pass through said load simulating resistor and said power source around said power winding and around the said unidirectional conductor in said first by-pass, said second by-pass including a unidirectional conductor determining the direction of current flow in said second by-pass to be the same as the direction of current flow through said resistor in said first by-pass.

5. In a polyphase magnetic amplifier-rectifier, in combination, a plurality of saturable reactors each individual to one phase, individual power windings for said reactors, a circuit path through each said winding, each said path including a unidirectional conductor individual to the path, a common load circuit connected to said power windings, a first plurality of by-pass circuits each individual to a single phase and each shunting the combination of the common load circuit and the individual unidirectional conductor for that phase, each said by-pass circuit including a unidirectional conductor individual thereto and a loading impedance individual thereto, each said last mentioned unidirectional conductor determining the direction of current flow in the individual by-pass circuit to be the same as the direction of current flow through the power winding to which the by-pass circuit is connected, and a second plurality of by-pass circuits each individual to a single phase and each shunting the power winding of that phase and the unidirectional conductor in the first by-pass circuit for that phase, each said second by-pass circuit including a unidirectional conductor determining the direction of current flow in said second by-pass circuit to be the same as the direction of current flow through said loading impedance in the said first by-pass circuit for the same phase.

6. Apparatus according to claim 5 in which the polyphase system is Y-connected with a neutral line common to all phases and in which all the said second plurality of by-pass circuits are returned to said neutral line.

7. In a polyphase magnetic amplifier-rectifier, in combination, a Y-connected power secondary, a neutral line connected thereto, a load circuit for rectified currents, said load circuit having a positive side and a negative side, each phase of said power secondary having two saturable reactors connected thereto, a first plurality of power windings each connected to a different phase and each individual to one of the reactors for the respective phase, an individual unidirectional conductor connected to each power winding of said first plurality, each said power winding feeding into the positive side of the load circuit through its individual unidirectional conductor, a second plurality of power windings each connected to a different phase and each individual to the second of the reactors for the respective phase, an individual unidirectional conductor connected to each power winding of said second plurality, each power winding in said second plurality being connected to the negative side of the load circuit through its individual unidirectional conductor, an auxiliary positive source of polyphase rectified current energized by said power secondary, individual paths from said positive source, each said path including a loading resistor and a unidirectional conductor and connecting to a different one of the said secondary plurality of power windings, each said path determining current flow through the respective power winding of the second plurality in the same direction as the current therein from the said negative side of the load circuit, an auxiliary negative source of polyphase rectified current energized by said power secondary, individual paths from said negative source each said path including a loading resistor and a unidirectional conductor and connecting to a different one of the said first plurality of power windings, each said last mentioned path determining current flow through the respective power winding of the first plurality in the same direction as the current therein passing into the said positive side of the load circuit, and an individual by-pass path for current directed toward each said loading resistor, each said by-pass path including a unidirectional conductor, one set of said last mentioned unidirectional conductors being connected in a circuit arranged to conduct current from said positive auxiliary source toward the neutral line and another set to conduct current from the neutral line toward said negative auxiliary source.

8. In a feedback controlled regulated power supply, in combination, voltage sensitive feedback means, current sensitive feedback means, means to combine signal outputs from both said feedback means to form a single output signal representing a combined effect of voltage feedback and current feedback, and means to reverse the polarity of the signal output from one of said feedback means prior to combining said signal outputs, means to employ said combined signal outputs to control the voltage-current characteristic of the power supply, whereby either a rising or a drooping voltage-current characteristic may be imparted to said regulated power supply.

9. Apparatus according to claim 8, together with means for separately varying the amplitudes of the signal outputs from both said feedback means.

10. In a control system for a polyphase magnetic amplifier, in combination, a polyphase power source, a plurality of saturable reactors each individual to a single phase, a load common to all the phases, a plurality of single phase loads, each individual to a single phase, a first plurality of reactifiers each connected between an individual one of said saturable reactors and said common load, a second plurality of rectifiers each connected between an individual one of said saturable reactors and an individual one of said single phase loads, and a plurality of by-pass circuits each including said polyphase power source and individual to a single phase, each including the respective single phase load and the rectifier of said second plurality of rectifiers that is connected to that single phase load, and each shunting the combination of the common load and the rectifier of said first plurality of rectifiers that is individual to that phase, whereby current is supplied through said second plurality of rectifiers to said saturable reactors during a full power half-cycle of each individual phase even though each rectifier of said first plurality of rectifiers supplies current during only a portion of a full power half-cycle.

11. Apparatus according to claim 10, together with voltage clamping means connected between one side of each said single phase load and the neutral conductor of said polyphase power source.

12. Apparatus according to claim 11, together with polyphase return circuits from said single phase load circuits to said polyphase power source, each said return circuit comprising a plurality of rectifiers each individual to a single phase.

13. In a program controlled feedback regulated power supply, in combination, a load and a regulating means each operatively connected to said power supply, load responsive means responsive to the amount of power currently supplied to said load by the power supply, program responsive means responsive to predetermined power requirements of the load to carry out a desired program of operation, over a period of time, differential responsive means connected both to said load responsive means and to said program responsive means to develop a control signal for actuating said regulating means, feedback modifying means connected to said load responsive means to modify the output of said load responsive means substantially independently of the amount of power currently supplied to the load, and means controlled by the said power supply regulating means to disable said feedback modifying means whenever the power currently supplied to the load exceeds a predetermined minimum value.

14. In a regulated power supply for a load circuit that has a negative impedance effect over a lower range of load currents and a positive impedance effect over a higher range of load currents, in combination, means to supply power to said load circuit in constant voltage-current ratio over said higher range of load currents, said means being controlled in response to variations in the demand for power in the load circuit, and an auxiliary source of unidirectional current and a current limiting resistor serially connected with each other and with said load circuit to supply auxiliary power to said load circuit in decreasing current increasing voltage relationship over a range of lower values of load current limited by the current from said auxiliary source due to the action of said current limiting resistor.

15. Apparatus according to claim 14, together with a second auxiliary source, and an impedance element serially connected to said second auxiliary source and so proportioned and adapted as to impart to said second source a voltage-current characteristic such that the current supplied by said second source decreases with rising voltage at a rate materially slower than does the current demanded by the load, said auxiliary sources being of unequal voltages and said impedance elements being so proportioned and adapted as to make said sources mainly effective each in a different current range, each said auxiliary source including a switching means comprising a unidirectional conductor so poled as to effectively disconnect one said auxiliary source from said load over a portion of the main current range of the other said auxiliary source.

16. Apparatus according to claim 14, in which the said current limiting resistor is of such value as to limit the currents supplied by said auxiliary source to the load substantially to the said current range wherein the said negative impedance effect exists.

17. Apparatus according to claim 14, in which said auxiliary source and said current limiting resistor are mutually so proportioned that over said lower range of load currents the rate of increase of the output voltage of the auxiliary source as the current drawn from the auxiliary source decreases is greater than the rate of increase of the load voltage as the load current demand decreases in the absence of the auxiliary source.

18. In a feedback controlled amplifier-rectifier, in combination, a magnetic amplifier including a saturable reactor used as a current control element, an alternating current power source of frequency $f$ for said magnetic amplifier, means to establish a current controlling bias in said saturable reactor during alternate half cycles of said frequency $f$ to determine the amplitude of the current passed by the saturable reactor during the half cycle immediately following the half cycle during which the said bias is established, whereby there is an inherent delay of one-half cycle of said frequency $f$ between a change in bias and a resultant change in amplitude of the current passed by the saturable reactor, a feedback path for normally negative feedback leading from the output of the magnetic amplifier to the input thereof for changing the bias in response to a change in the output current within which path said delay tends to produce a positive feedback and means incorporated in said feedback path to discriminate selectively against variations in output current occurring at frequencies in the neighborhood of one-half the said frequency $f$, whereby positive feedback is substantially prevented at said half frequency.

19. Apparatus according to claim 18, in which the said frequency discriminating means in the feedback path comprises a parallel combination of a first resistance $R_1$ and a first capacitance $C_1$ in series with a serial combination of a second resistance $R_2$ and a second capacitance $C_2$, of such respective resistance and capacitance values as to substantially satisfy the equation $$\tfrac{1}{2}f = \frac{1}{2\pi\sqrt{R_1 C_1 R_2 C_2}}$$

References Cited in the file of this patent
UNITED STATES PATENTS

| | | |
|---|---|---|
| 2,673,324 | Burton et al. | Mar. 23, 1954 |
| 2,751,545 | Chase | June 19, 1956 |
| 2,759,142 | Hamilton | Aug. 14, 1956 |
| 2,790,127 | Hamilton | Apr. 23, 1957 |
| 2,903,639 | Meszaros | Sept. 8, 1959 |
| 2,909,720 | Fthenakis | Oct. 20, 1959 |
| 2,945,172 | Bixby | July 12, 1960 |
| 2,982,904 | Koppelmann | May 2, 1961 |

UNITED STATES PATENT OFFICE
CERTIFICATE OF CORRECTION

Patent No. 3,123,761                                    March 3, 1964

William J. Greene

It is hereby certified that error appears in the above numbered patent requiring correction and that the said Letters Patent should read as corrected below.

Column 2, line 9, for "tranfsormer" read -- transformer --; line 66, for "inhrent" read -- inherent --; column 5, line 70, for "cascade" read -- cascaded --; column 8, line 29, for "As" read -- At --; column 12, line 44, for "fo" read -- of --; column 18, line 25, for "transmited" read -- transmitted --; column 21, line 70, after "combination" insert -- , a power source, --; line 71, strike out "a power source,"; column 23, line 59, for "secondary" read -- second --; column 24, line 25, for "reactifiers" read -- rectifiers --; column 26, line 15, for "incorported" read -- incorporated --.

(SEAL)         Signed and sealed this 1st day of December 1964.

Attest:

ERNEST W. SWIDER                                  EDWARD J. BRENNER
Attesting Officer                                       Commissioner of Patents